United States Patent
Atarashi et al.

(10) Patent No.: US 10,023,181 B2
(45) Date of Patent: Jul. 17, 2018

(54) CONTROL DEVICE FOR VEHICLE DRIVE DEVICE

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Tomo Atarashi, Kariya (JP); Masaki Yoshida, Anjo (JP); Tooru Matsubara, Toyota (JP); Munehiro Katsumata, Toyota (JP); Kazuyuki Shiiba, Miyoshi (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/518,624

(22) PCT Filed: Oct. 23, 2015

(86) PCT No.: PCT/JP2015/080031
§ 371 (c)(1),
(2) Date: Apr. 12, 2017

(87) PCT Pub. No.: WO2016/084529
PCT Pub. Date: Jun. 2, 2016

(65) Prior Publication Data
US 2017/0225676 A1    Aug. 10, 2017

(30) Foreign Application Priority Data

Nov. 28, 2014 (JP) ................................. 2014-241295

(51) Int. Cl.
*B60W 20/30* (2016.01)
*B60W 10/11* (2012.01)
(Continued)

(52) U.S. Cl.
CPC ............ *B60W 20/30* (2013.01); *B60W 10/08* (2013.01); *B60W 10/11* (2013.01); *B60K 6/547* (2013.01)

(58) Field of Classification Search
None
See application file for complete search history.

(56) References Cited

U.S. PATENT DOCUMENTS

2010/0069197 A1    3/2010  Yamazaki
2010/0130321 A1*   5/2010  Eto ....................... B60K 6/365
                                                              475/5
(Continued)

FOREIGN PATENT DOCUMENTS

JP    2005-344850 A    12/2005
JP    2006-160238 A    6/2006
(Continued)

OTHER PUBLICATIONS

Jan. 12, 2016 International Search Report issued in International Application No. PCT/JP2015/080031.

*Primary Examiner* — Justin Holmes
(74) *Attorney, Agent, or Firm* — Oliff PLC

(57) ABSTRACT

A control device that includes an electronic control unit that is programmed to: perform shift device shift control in order to change a speed ratio, which is a ratio of a rotational speed of the internal combustion engine to a rotational speed of the output member, by changing at least the shift speed that is established by the shift device; and perform differential gear shift control in in order to change the speed ratio by changing rotational speeds of the first rotary element and the second rotary element of the differential gear unit without changing the shift speed that is established by the shift device.

12 Claims, 10 Drawing Sheets

(51) Int. Cl.
 *B60W 10/08* (2006.01)
 *B60K 6/547* (2007.10)

(56) References Cited

U.S. PATENT DOCUMENTS

| | | | | |
|---|---|---|---|---|
| 2014/0005866 A1* | 1/2014 | Kuang | ................. | B60W 10/06 |
| | | | | 701/22 |
| 2014/0058603 A1* | 2/2014 | Ito | ......................... | B60K 6/445 |
| | | | | 701/22 |
| 2014/0191689 A1* | 7/2014 | Noguchi | ................. | B60K 6/52 |
| | | | | 318/3 |
| 2014/0206500 A1* | 7/2014 | Kumazaki | ................ | B60K 6/44 |
| | | | | 477/4 |

FOREIGN PATENT DOCUMENTS

| | | | |
|---|---|---|---|
| JP | 2008-195217 A | 8/2008 |
| JP | 2009-196454 A | 9/2009 |
| JP | 2010-254072 A | 11/2010 |
| JP | 2012-030626 A | 2/2012 |

* cited by examiner

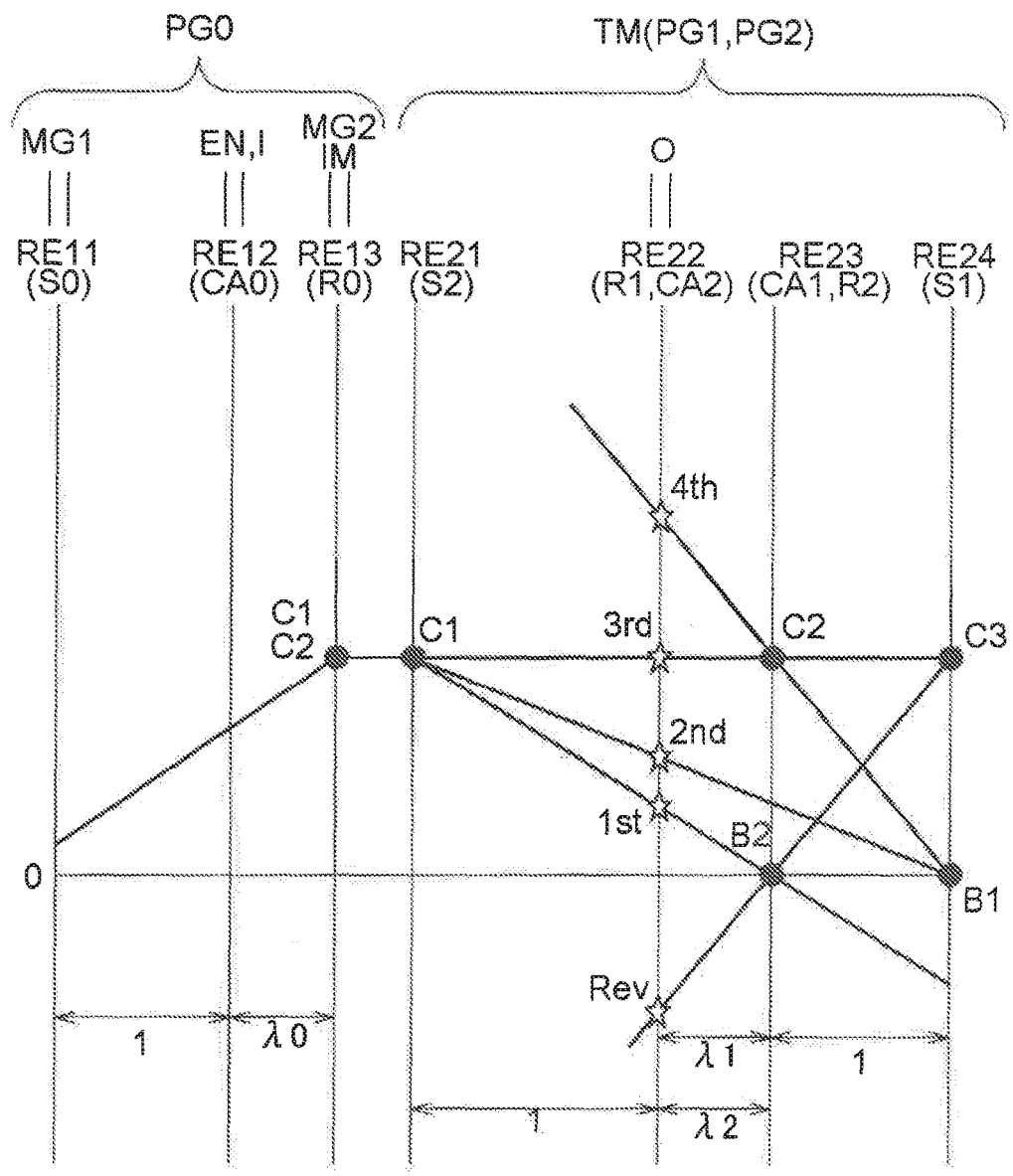

CONTROL DEVICE FOR VEHICLE DRIVE DEVICE

BACKGROUND

The present disclosure relates to control devices that control a vehicle drive device including a first rotating electrical machine, a second rotating electrical machine, a differential gear unit, and a shift device.

For example, techniques described in Japanese Patent Application Publication No. 2008-195217 and Japanese Patent Application Publication No. 2012-30626 are known regarding such control devices. In the technique described in Japanese Patent Application Publication No. 2008-195217, one of three rotary elements of a differential gear unit is coupled to an internal combustion engine, a first rotating electrical machine, and an output member, and a second rotating electrical machine is coupled to the output member.

In the technique of Japanese Patent Application Publication No. 2008-195217, the speed ratio can be steplessly changed by using the differential gear unit. However, when a manual shift mode is set, the control device performs control so that the speed ratio is changed stepwise.

In the technique described in Japanese Patent Application Publication No. 2012-30626, one of three rotary elements of a differential gear unit is coupled to an internal combustion engine, a first rotating electrical machine, a second rotating electrical machine, and a stepped shift device. In the technique of Japanese Patent Application Publication No. 2012-30626, the speed ratio is changed stepwise by the stepped shift device, and the speed ratio is steplessly changed by the differential gear unit.

SUMMARY

In the case where the speed ratio is changed stepwise by the stepped shift device, the driver experiences characteristic shift feels such as a change in rotational speed of the internal combustion engine and a shift shock that is transmitted to the wheels. If the speed ratio is merely changed stepwise by the differential gear unit that can steplessly change the speed ratio, a change in rotational speed of the internal combustion engine and a shift shock that is transmitted to the wheels are different from the case where the speed ratio is changed stepwise by the stepped shift speed. Accordingly, if a change in speed ratio by the stepped shift device and a stepwise change in speed ratio by the differential gear unit that can steplessly change the speed ratio are combined, the driver tends to feel the difference in shift feel between these changes. This gives the driver a bad impression about a shift feel.

Accordingly, an exemplary aspect of the disclosure implements a control device for a vehicle driving device which can restrain the driver from feeling the difference in shift feel even if a change in speed ratio by a stepped shift device and a stepwise change in speed ratio by a differential gear unit that can steplessly change the speed ratio are combined.

In view of the above, a control device that controls a vehicle drive device that includes a first rotating electrical machine, a second rotating electrical machine, a differential gear unit that has a first rotary element, a second rotary element, and a third rotary element in order of arrangement in a speed diagram, the first rotating electrical machine being drivingly coupled to the first rotary element, an internal combustion engine being drivingly coupled to one of the second rotary element and the third rotary element, the second rotating electrical machine and an intermediate input member being drivingly coupled to the other of the second rotary element and the third rotary element, and a shift device that includes a plurality of engagement devices, that selectively establishes a plurality of shift speeds having different speed ratios according to engagement states of the plurality of engagement devices, that shifts a rotational speed of the intermediate input member at the speed ratio of the established shift speed and transmits a resultant rotation to an output member drivingly coupled to wheels, the control device including an electronic control unit that is programmed to perform shift device shift control in order to change a speed ratio, which is a ratio of a rotational speed of the internal combustion engine to a rotational speed of the output member, by changing at least the shift speed that is established by the shift device; and perform differential gear shift control in order to change the speed ratio by changing rotational speeds of the first rotary element and the second rotary element of the differential gear unit without changing the shift speed that is established by the shift device, wherein the electronic control unit controls at least output torques of the first rotating electrical machine and the second rotating electrical machine so that a controlled parameter that is controlled during the differential gear shift control undergoes a change similar to a change in the controlled parameter that is controlled during the shift device shift control, the controlled parameter that is controlled during the differential gear shift control being at least one of the rotational speed of the internal combustion engine and torque transmitted from the shift device to the output member.

With this characteristic configuration, the controlled parameter that is controlled during the differential gear shift control, and that is at least one of the rotational speed of the internal combustion engine and the torque transmitted from the shift device to the output member, can be made to undergo a change similar to a change in the controlled parameter that is controlled during the shift device shift control. Accordingly, even if a change in the speed ratio by the stepped shift device and a stepwise change in the speed ratio by the differential gear unit that can steplessly change the speed ratio are combined, the driver can be restrained from feeling the difference in shift feel between these changes.

BRIEF DESCRIPTION OF THE DRAWINGS

Various exemplary aspects of the disclosure will be described with reference to the drawings, wherein:

FIG. 2 is a speed diagram of the vehicle drive device according to the embodiment.

FIG. 3 is an operation table of a shift device according to the embodiment.

DETAILED DESCRIPTION OF EMBODIMENTS

1. Configuration of Vehicle Drive Device 1

Figure 1:
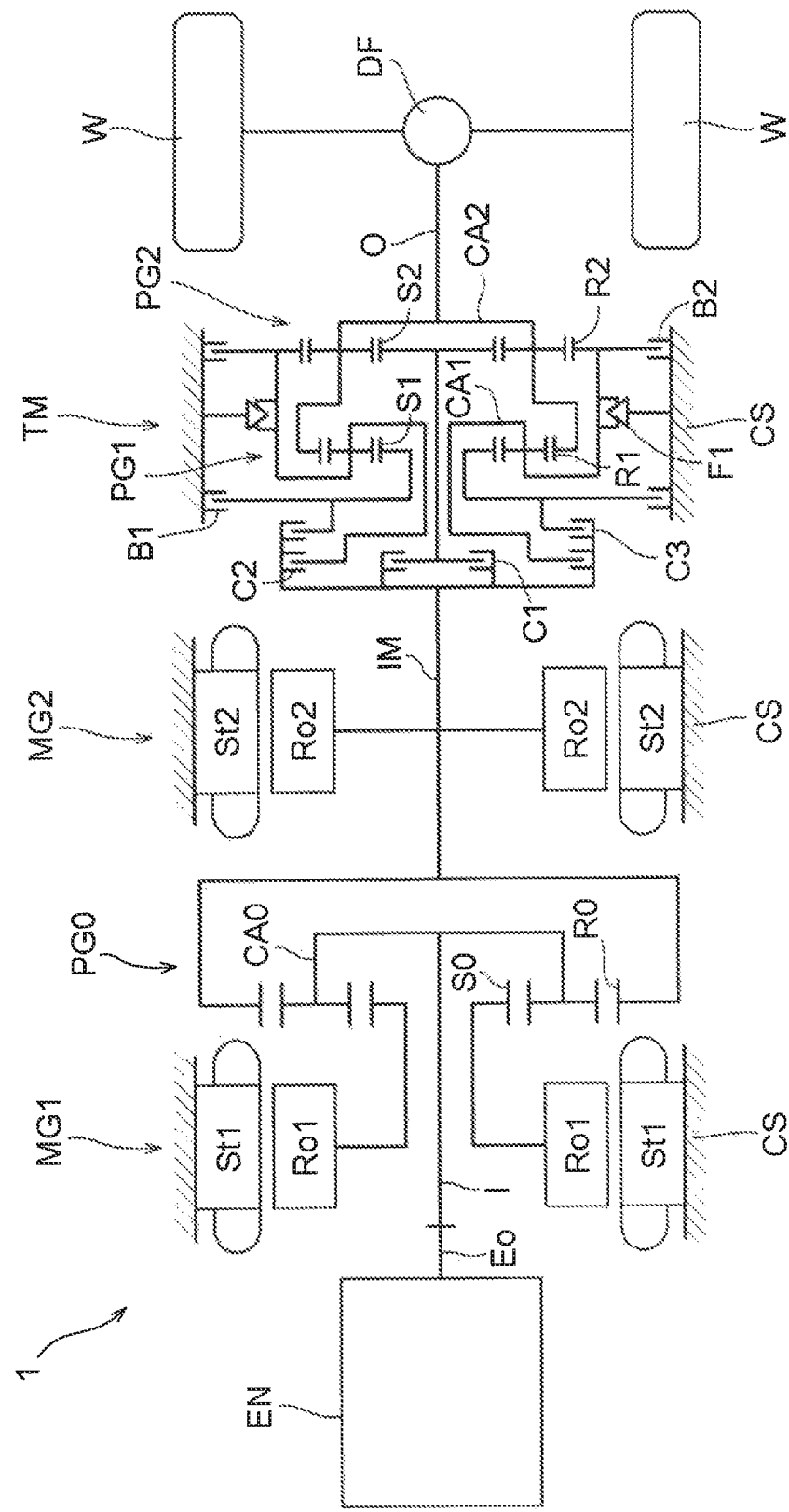
FIG. 1 is a skeleton diagram of a vehicle drive device according to an embodiment.
Figure 4:
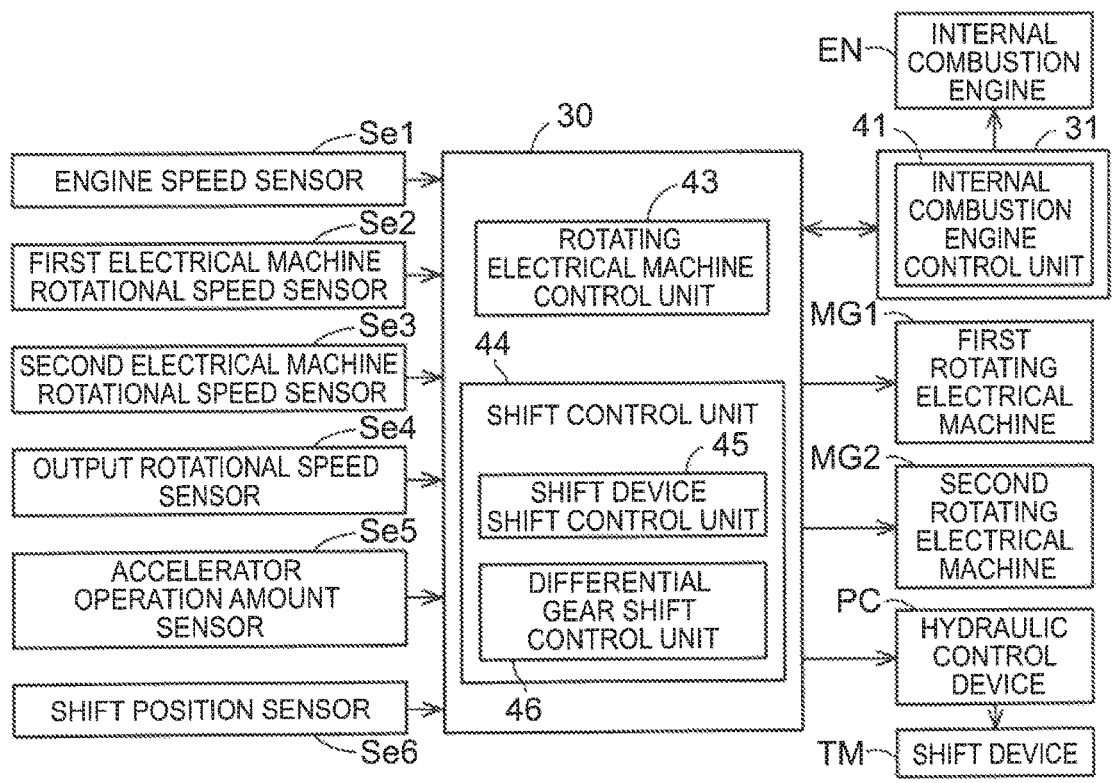
FIG. 4 is a block diagram of a control device according to the embodiment.

First, the configuration of a vehicle drive device 1 for hybrid vehicles according to an embodiment will be described. FIG. 1 is a skeleton diagram showing a schematic configuration of the vehicle drive device 1. FIG. 2 is a speed diagram of the vehicle drive device 1. FIG. 3 is an engagement table of a shift device TM. FIG. 4 is a block diagram of a control device 30. As shown in FIG. 1, the vehicle drive device 1 includes a first rotating electrical machine MG1, an input member I that is drivingly coupled to an internal combustion engine EN, an output member O that is drivingly coupled to wheels W, a second rotating electrical machine MG2, a differential gear unit PG0, and a shift device TM. As shown in FIG. 2, the differential gear unit PG0 has a first rotary element RE11, a second rotary element RE12, and a third rotary element RE13 in order of arrangement in the speed diagram. The first rotating electrical machine MG1 is drivingly coupled to the first rotary element RE11, the internal combustion engine EN is drivingly coupled to the second rotary element RE12 via the input member I, and the second rotating electrical machine MG2 and an intermediate input member IM are drivingly coupled to the third rotary element RE13. As shown in FIGS. 1 to 3, the shift device TM includes a plurality of engagement devices C1, B1, . . . , and selectively establishes a plurality of shift speeds 1st, 2nd, . . . having different speed ratios according to the engagement states of the plurality of engagement devices C1, B1, . . . . The shift device TM shifts the rotational speed ωim of the intermediate input member IM at the speed ratio Ktm of the established shift speed and transmits the resultant rotation to the output member O.

As used herein, the expression "drivingly coupled" refers to the state where two rotary elements are coupled together so that they can transmit a driving force therebetween, and is used as a concept including the state where the two rotary elements are coupled together so as to rotate together, or the state where the two rotary elements are coupled together so that they can transmit a driving force therebetween via one or more transmission members. Such transmission members include various members that transmit rotation at the same speed or a shifted speed and include, e.g., a shaft, a gear mechanism, a belt, a chain, etc. Such transmission members may include an engagement device that selectively transmits rotation and a driving force, such as, e.g., a friction engagement device and a meshing engagement device. When the expression "drivingly coupled" is used for the rotary elements of the differential gear unit, this refers to the state where the three or more rotary elements of the differential gear unit are drivingly coupled to each other without via other rotary elements.

As used herein, the term "rotating electrical machine" is used as a concept including all of a motor (electric motor), a generator (electric generator), and a motor-generator that functions as both a motor and a generator as necessary.

As used herein, the term "order of arrangement in the speed diagram" refers to the order in which axes corresponding to the rotary elements are arranged in the direction perpendicular to the axes in the speed diagram (alignment chart). Although the direction in which the axes corresponding to the rotary elements are arranged in the speed diagram (alignment chart) varies depending on how the speed diagram is drawn, the order of arrangement of the axes is determined by the structure of the differential gear unit and therefore is the same regardless of how the speed diagram is drawn. The "order of arrangement of the rotary elements in the speed diagram" means the order of the rotational speeds of the rotary elements in a rotating state. The order of the rotational speeds of the rotary elements refers to the order of the rotational speeds of the rotary elements in a rotating state. Although the rotational speed of each rotary element varies depending on the rotational state of the differential gear mechanism, the order of the rotational speeds of the rotary elements is determined by the structure of the differential gear mechanism and therefore is always the same.

<Internal Combustion Engine EN>

The internal combustion engine EN is a heat engine that is driven by fuel combustion. For example, various known internal combustion engines such as a gasoline engine and a diesel engine can be used as the internal combustion engine EN. In this example, an engine output shaft Eo of the internal combustion engine EN, such as a crankshaft, is drivingly coupled to the input member I.

<Differential Gear Unit PG0>

As shown in FIG. 2, the differential gear unit PG0 has the first rotary element RE11, the second rotary element RE12, and the third rotary element RE13 in order of arrangement in the speed diagram. The differential gear unit PG0 is a single-pinion type planetary gear unit and has three rotary elements, namely a carrier CA0 that supports a plurality of pinion gears, a sun gear S0 that meshes with the pinion gears, and a ring gear R0 that meshes with the pinion gears. The sun gear S0 is the first rotary element RE11, the carrier CA0 is the second rotary element RE12, and the ring gear R0 is the third rotary element RE13.

In the present embodiment, the first rotary element RE11 (sun gear S0) of the differential gear unit PG0 is drivingly coupled to the first rotating electrical machine MG1 so as to rotate with the first rotating electrical machine MG1. The second rotary element RE12 (carrier CA0) of the differential gear unit PG0 is drivingly coupled to the internal combustion engine EN via the input member I so as to rotate with the internal combustion engine EN via the input member I. The third rotary element RE13 (ring gear R0) of the differential gear unit PG0 is drivingly coupled to the second rotating electrical machine MG2 and the intermediate input member IM so as to rotate with the second rotating electrical machine MG2 and the intermediate input member IM.

The differential gear unit PG0 can function as a stepless shift device that can steplessly change the speed ratio Kpg (hereinafter referred to as the speed ratio Kpg of the differential gear unit PG0), which is the ratio of the rotational speed ωe of the internal combustion engine EN to the rotational speed ωim of the intermediate input member IM, by changing the balance of the rotational speed among the rotary elements. As used herein, the speed ratio Kpg of the differential gear unit PG0 is a value obtained by dividing the rotational speed ωe of the internal combustion engine EN by the rotational speed ωim of the intermediate input member IM (Kpg=ωe/ωim).

<First Rotating Electrical Machine MG1>

The first rotating electrical machine MG1 has a stator St1 fixed to a case CS accommodating the vehicle drive device 1, and a rotor Ro1 rotatably supported radially inside the stator St1 at a position corresponding to the stator St. The rotor Ro1 of the first rotating electrical machine MG1 is drivingly coupled to the first rotary element RE11 (sun gear S0) of the differential gear unit PG0 so as to rotate with the first rotary element RE11 (sun gear S0). The first rotating electrical machine MG1 is electrically connected to a battery, which serves as an electricity storage device, via an inverter that converts direct current to alternating current. The first rotating electrical machine MG1 can function both as a motor (electric motor) that is supplied with electric power and generates power and as a generator (electric generator) that is supplied with power and generates electric power. That is, the first rotating electrical machine MG1 performs power running by using electric power supplied from the battery via the inverter, or generates electric power by using a rotational driving force transmitted from the internal combustion engine EN or the wheels W. The generated electric power is stored in the battery via the inverter.

<Second Rotating Electrical Machine MG2>

The second rotating electrical machine MG2 has a stator St2 fixed to the case CS accommodating the vehicle drive device 1, and a rotor Ro2 rotatably supported radially inside the stator St2 at a position corresponding to the stator St2. The rotor Ro2 of the second rotating electrical machine MG2 is drivingly coupled to the third rotary element RE13 (ring gear R0) of the differential gear unit PG0 and the intermediate input member IM so as to rotate with the third rotary element RE13 (ring gear R0) and the intermediate input member IM. The second rotating electrical machine MG2 is electrically connected to the battery, which serves as an electricity storage device, via an inverter that converts direct current to alternating current. The second rotating electrical machine MG2 can function both as a motor (electric motor) that is supplied with electric power and generates power and as a generator (electric generator) that is supplied with power and generates electric power. That is, the second rotating electrical machine MG2 performs power running by using electric power supplied from the battery via the inverter, or generates electric power by using a rotational driving force transmitted from the internal combustion engine EN or the wheels W. The generated electric power is stored in the battery via the inverter.

<Shift Device TM>

The shift device TM is drivingly coupled to the intermediate input member IM. In the present embodiment, the shift device TM is a stepped automatic shift device having a plurality of shift speeds with different speed ratios. The shift device TM includes a gear mechanism such as a planetary gear unit and the plurality of engagement devices C1, B1, . . . in order to establish the plurality of shift speeds. The shift device TM shifts the rotational speed $\omega im$ of the intermediate input member IM and converts torque of the intermediate input member IM at the speed ratio Ktm of each shift speed and transmits the resultant rotation and torque to the output member O. The torque transmitted from the shift device TM to the output member O is distributed and transmitted to two axles, namely right and left axles, via an output differential gear unit DF, and is thus transmitted to the wheels W drivingly coupled to the axles. The speed ratio Ktm of the shift device TM is the ratio of the rotational speed $\omega im$ of the intermediate input member IM to the rotational speed $\omega o$ of the output member O in the case where each shift speed is established by the shift device TM, and is herein a value obtained by dividing the rotational speed $\omega im$ of the intermediate input member IM by the rotational speed $\omega o$ of the output member O (Ktm=$\omega im$/$\omega o$). That is, the rotational speed $\omega o$ of the output member O is a rotational speed obtained by dividing the rotational speed $\omega im$ of the intermediate input member 1M by the speed ratio Ktm. Torque To that is transmitted from the shift device TM to the output member O (hereinafter referred to as the "shift output torque To") is torque obtained by multiplying torque Tim transmitted from the intermediate input member IM to the shift device TM (hereinafter referred to as the "shift input torque Tim") by the speed ratio Ktm (To=Tim×Ktm).

In the present embodiment, as shown in the operation table of FIG. 3, the shift device TM has four shift speeds (first shift speed 1st, second shift speed 2nd, third shift speed 3rd, fourth shift speed 4th) having different speed ratios (speed reduction ratio or speed increase ratio) as forward shift speeds. In order to establish these shift speeds, the shift device TM includes a gear mechanism including a first planetary gear unit PG1 and a second planetary gear unit PG2, and six engagement devices C1, C2, C3, B1, B2, F1. The shift device TM controls engagement and disengagement of the plurality of engagement devices C1, B1, . . . except for the one-way clutch F1 to switch the rotational state of each rotary element of the first planetary gear unit PG1 and the second planetary gear unit PG2, and switches the four shift speeds by selectively engaging the plurality of engagement devices B1, B1, . . . . The shift device TM has a single reverse shift speed Rev in addition to the four shift speeds. In FIG. 3, "◯" means that the engagement device is in an engaged state, and "blank" means that the engagement device is in a disengaged state.

<Rotary Elements of Shift Device TM>

In the present embodiment, as shown in FIG. 2, the shift device TM has a first rotary element RE21, a second rotary element RE22, a third rotary element RE23, and a fourth rotary element RE24 in order of arrangement in the speed diagram. The shift device TM is formed by two single-pinion type planetary gear units PG1, PG2. The first planetary gear unit PG1 has three rotary elements, namely a first carrier CA1 that supports a plurality of pairs of pinion gears, a first sun gear S1 that meshes with the pinion gears, and a first ring gear R1 that meshes with the pinion gears. The second planetary gear unit PG2 has three rotary elements, namely a second carrier CA2 that supports a plurality of pairs of pinion gears, a second sun gear S2 that meshes with the pinion gears, and a second ring gear R2 that meshes with the pinion gears. The first carrier CA1 of the first planetary gear unit PG1 and the second ring gear R2 of the second planetary gear unit PG2 are rotary elements that are coupled to each other so as to rotate together. The first ring gear R1 of the first planetary gear unit PG1 and the second carrier CA2 of the second planetary gear unit PG2 are rotary elements that are coupled to each other so as to rotate together. The first rotary element RE21 is the second sun gear S2. The second rotary element RE22 is the first ring gear R1 and the second carrier CA2 which rotate together. The third rotary element RE23 is the first carrier CA1 and the second ring gear R2 which rotate together. The fourth rotary element RE24 is the first sun gear S1.

The first rotary element RE21 (second sun gear S2) of the shift device TM is drivingly coupled to the third rotary element RE13 (ring gear R0) of the differential gear unit PG0 via the first clutch C1. The second rotary element RE22 (first ring gear R1 and second carrier CA2) of the shift device TM is drivingly coupled to the output member O. The third rotary element RE23 (first carrier CA1 and second ring gear R2) of the shift device TM is drivingly coupled to the third rotary element RE13 (ring gear R0) of the differential gear unit PG0 via the second clutch C2, and is selectively held stationary via the second brake B2 with respect to the case CS that serves as a non-rotary member. The fourth rotary element RE24 (first sun gear S1) of the shift device TM is selectively held stationary via the first brake B1 or the one-way clutch F1 with respect to the case CS that serves as a non-rotary member, and is drivingly coupled to the third rotary element RE13 (ring gear R0) of the differential gear unit PG0 via the third clutch C3.

<Speed Diagram>

In the speed diagram shown in FIG. 2, the ordinate corresponds to the rotational speed of each rotary element. That is, "0" on the ordinate means that the rotational speed is zero. The region above "0" represents positive rotation (the rotational speed is positive), and the region below "0" represents negative rotation (the rotational speed is negative). A plurality of parallel vertical lines correspond to the rotary elements of the differential gear unit PG0 and the rotary elements of the shift device TM. Specifically, "RE11 (S0)," "RE12 (CA0)," and "RE13 (R0)" shown on top of each vertical line refer to the first rotary element RE1 (sun gear S0), the second rotary element RE12 (carrier CA0), and the third rotary element RE13 (ring gear R0) of the differential gear unit PG0, respectively. Moreover, "RE21 (S2)," "RE22 (R1, CA2)," "RE23 (CA1, R2)," and "RE24 (S1)" shown on top of each vertical line refer to the first rotary element RE21 (second sun gear S2), the second rotary element RE22 (first ring gear R1 and second carrier CA2), the third rotary element RE23 (first carrier CA1 and second ring gear R2), and the fourth rotary element RE24 (first sun gear S1) of the shift device TM, respectively. The intervals of the plurality of parallel vertical lines are determined based on the respective gear ratios $\lambda 0$, $\lambda 1$, $\lambda 2$ (the ratio of the number of teeth between the sun gear and the ring gear=[the number of teeth of the sun gear]/[the number of teeth of the ring gear]) of the differential gear unit PG0, the first planetary gear unit PG1, and the second planetary gear unit PG2.

In the speed diagram, "●" means that the engagement device coupled to the corresponding rotary element is in an engaged state, and "C1," "C2," "C3," "B1," "B2," etc. shown next to "●" refer to the engagement devices that are in an engaged state. Moreover, "☆" indicates the state of the rotational speed of the second rotary element RE22 (first ring gear R1 and second carrier CA2) of the shift device TM which is coupled to the output member O, and "1st," "2nd," "3rd," "4th," "Rev," etc. shown next to "☆" refer to the shift speeds that are established.

<Shift Speeds>

As shown in FIGS. 2 and 3, the first shift speed 1st is established by engagement of the first clutch C1 and engagement of the second brake B2. When the second brake B2 is in an engaged state, the third rotary element RE23 of the shift device TM is held stationary with respect to the case CS and the rotational speed of the third rotary element RE23 is zero. When the first clutch C1 is in an engaged state, a rotational driving force that is applied from the intermediate input member IM to the first rotary element RE21 of the shift device TM is reduced in speed based on the gear ratio $\lambda 2$ of the second planetary gear unit PG2, and the resultant rotational driving force is transmitted to the second rotary element RE22 of the shift device TM which is drivingly coupled to the output member O. The shift device TM may be configured so that the one-way clutch F1 instead of the second brake B2 is engaged except when regeneration is performed.

The second shift speed 2nd is established by engagement of the first clutch C1 and engagement of the first brake B1. When the first brake B1 is in an engaged state, the rotational speed of the fourth rotary element RE24 of the shift device TM is held stationary with respect to the case CS and the rotational speed of the fourth rotary element RE24 is zero. When the first clutch C1 is in an engaged state, a rotational driving force that is applied from the intermediate input member IM to the first rotary element RE21 of the shift device TM is reduced in speed based on the gear ratio $\lambda 2$ of the second planetary gear unit PG2 and the gear ratio $\lambda 1$ of the first planetary gear unit PG1, and the resultant rotational driving force is transmitted to the second rotary element RE22 of the shift device TM which is drivingly coupled to the output member O.

The third shift speed 3rd is established by engagement of the first clutch C1 and engagement of the second clutch C2. When the first clutch C1 and the second clutch C2 are in an engaged state, the fourth rotary element RE24 and the third rotary element RE23 of the shift device TM rotate at the same speed, so that a rotational driving force of the intermediate input member IM is transmitted as it is to the output member O.

The fourth shift speed 4th is established by engagement of the second clutch C2 and engagement of the first brake B1. When the first brake B1 is in an engaged state, the rotational speed of the fourth rotary element RE24 of the shift device TM is held stationary with respect to the case CS and the rotational speed of the fourth rotary element RE24 is zero. When the second clutch C2 is in an engaged state, a rotational driving force that is applied from the intermediate input member IM to the third rotary element RE23 of the shift device TM is increased in speed based on the gear ratio $\lambda 1$ of the first planetary gear unit PG1, and the resultant rotational driving force is transmitted to the second rotary element RE22 of the shift device TM which is drivingly coupled to the output member O.

These shift speeds are the first shift speed 1st, the second shift speed 2nd, the third shift speed 3rd, the fourth shift speed 4th in descending order of the speed ratio Ktm (speed reduction ratio or speed increase ratio) between the intermediate input member IM and the output member O.

The reverse shift speed Rev is established by engagement of the third clutch C3 and engagement of the second brake B2. Specifically, when the third clutch C3 is in an engaged state, a rotational driving force that is applied from the intermediate input member IM to the fourth rotary element RE24 of the shift device TM is reduced in speed based on the gear ratio 1 of the first planetary gear unit PG1 and is reversed in rotational direction, and the resultant rotational driving force is transmitted to the second rotary element RE22 of the shift device TM which is drivingly coupled to the output member O.

<Engagement Devices>

In the present embodiment, the plurality of engagement devices C1, C2, C3, B1, B2 of the shift device TM except for the one-way clutch F1 are friction engagement devices. Specifically, these engagement devices are hydraulic multi-plate clutches or hydraulic multi-plate brakes. The engagement states of these engagement devices C1, C2, C3, B1, B2 are controlled by an oil pressure that is supplied from a hydraulic control device.

A friction engagement device transmits torque between its engagement members by friction between the engagement members. When there is a difference in rotational speed (slipping) between the engagement members of the friction engagement device, torque (slip torque) corresponding to the magnitude of transfer torque capacity is transmitted from the member rotating at a higher speed to the member rotating at a lower speed by kinetic friction. When there is no difference in rotational speed (slipping) between the engagement members of the friction engagement device, the friction engagement device transmits torque which is up to the magnitude of the transfer torque capacity and is acting between the engagement members of the friction engagement device by static friction. The transfer torque capacity is the magnitude of maximum torque the friction engagement device can transmit by friction. The magnitude of the transfer torque capacity changes in proportion to the engagement pressure of the friction engagement device. The engagement pressure is a pressure (or force) with which the input-side engagement member (friction plate) and the output-side engagement member (friction plate) are pressed against each other. In the present embodiment, the engagement pressure changes in proportion to the magnitude of the oil pressure being supplied. That is, in the present embodiment, the magnitude of the transfer torque capacity changes in proportion to the magnitude of the oil pressure being supplied to the friction engagement device.

Each friction engagement device includes a return spring and is biased to the disengagement side by the reaction force of the spring. When a force that is generated by the oil pressure supplied to a hydraulic cylinder of each friction engagement device becomes larger than the reaction force of the spring, the transfer torque capacity starts to be generated in each friction engagement device, and each friction engagement device changes from a disengaged state to an engaged state. The oil pressure at which the transfer torque capacity starts to be generated is called a "stroke end pressure." Each friction engagement device is configured so that the transfer torque capacity increases in proportion to an increase in oil pressure after the supplied oil pressure becomes higher than the stroke end pressure. The friction engagement devices may not include a return spring and may be controlled by the difference between the oil pressures on both sides of a piston of the hydraulic cylinder.

In the present embodiment, the engaged state refers to the state where the transfer torque capacity is being generated in the engagement device, and includes a slip engaged state and a direct engaged state. The disengaged state refers to the state where no transfer torque capacity is being generated in the engagement device. The slip engaged state refers to the engaged state where there is a difference in rotational speed (slipping) between the engagement members of the engagement device, and the direct engaged state refers to the engaged state where there is no difference in rotational speed (slipping) between the engagement members of the engagement device. A non-direct engaged state refers to the engaged states other than the direct engaged state, and includes the disengaged state and the slip engaged state.

There is a case where the transfer torque capacity is generated in the friction engagement device by dragging between the engagement members (friction members) even when a command to generate the transfer torque capacity is not output from the control device 30. For example, even if the friction members are not being pressed against each other by the piston, the friction members may contact each other and the transfer torque capacity may be generated by dragging between the friction members. Accordingly, the "disengaged state" herein includes the state where the transfer torque capacity is being generated by dragging between the friction members when a command to generate the transfer torque capacity is not output from the control device 30 to the friction engagement device.

<Hydraulic Control System>

A hydraulic control system of the vehicle drive device 1 includes a hydraulic control device PC that controls the oil pressure of hydraulic oil supplied from a hydraulic pump driven by a driving force source of a vehicle or a dedicated motor to a predetermined pressure (see FIG. 4). The hydraulic control device PC includes hydraulic control valves such as a plurality of linear solenoid valves that regulate the oil pressures that are supplied to the engagement devices C1, B1, . . . etc. Each hydraulic control valve regulates its opening according to a signal value of an oil pressure command supplied from the control device 30, thereby supplying hydraulic oil of the oil pressure corresponding to the signal value to each engagement device C1, B1, . . . . The signal value that is supplied from the control device 30 to each linear solenoid valve is a current value. The oil pressure that is output from each linear solenoid valve is basically proportional to the current value that is supplied from the control device 30.

The hydraulic control device PC regulates the opening of one or more regulating valves based on the oil pressure (signal pressure) that is output from the linear solenoid valve for oil pressure regulation. The hydraulic control device PC thus regulates the amount of hydraulic oil to be drained from the regulating valve and regulates the oil pressure of the hydraulic oil to one or more predetermined pressures. The hydraulic oil thus regulated to the predetermined pressure is supplied to each of the plurality of engagement devices C1, B1, . . . etc. of the shift device TM at a required oil pressure level.

2. Configuration of Control Device 30

The configurations of the control device 30 that controls the vehicle drive device 1 and an internal combustion engine control device 31 will be described below. FIG. 4 is a block diagram of the control device 30 and the internal combustion engine control device 31.

The control device 30 and the internal combustion engine control device 31 include as a core member an arithmetic processing unit such as CPU, and further includes a storage device such as a random access memory (RAM) that allows data to be read and written by the arithmetic processing unit or a read only memory (ROM) that allows data to be read by the arithmetic processing unit, etc. Each functional unit 41, 43 to 46 etc. of the control device 30 is formed by software (program) stored in the ROM etc. of the control device or hardware such as an arithmetic circuit provided separately, or by both the software and the hardware. The control device 30 and the internal combustion engine control device 31 communicate with each other, share various types of information such as sensor detection information and control parameters, and cooperatively perform control to implement the functions of the functional units 41, 43 to 46.

The vehicle drive device 1 includes sensors such as sensors Se1 to Se6, and electrical signals that are output from the sensors are input to the control device 30 and the internal combustion engine control device 31. The control device 30 and the internal combustion engine control device 31 calculate detection information on each sensor based on the received electrical signals.

The engine speed sensor Se1 is a sensor that detects the rotational speed $\omega e$ of an engine output shaft Eo (internal combustion engine EN). The internal combustion engine control device 31 detects the rotational speed $\omega e$ (angular velocity) of the internal combustion engine EN based on the signal received from the engine speed sensor Se1. Since the second rotary element RE12 of the differential gear unit PG0 and the input member I are drivingly coupled to the internal combustion engine EN so as to rotate with the internal combustion engine EN, the control device 30 detects the rotational speeds of the second rotary element RE12 of the differential gear unit PG0 and the input member I based on the signal received from the engine speed sensor Se1.

The first electrical machine rotational speed sensor Se2 is a sensor that detects the rotational speed ωmg1 of the first rotating electrical machine MG1. The control device 30 detects the rotational speed ωmg1 (angular velocity) of the first rotating electrical machine MG1 based on the signal received from the first electrical machine rotational speed sensor Se2. Since the first rotary element RE11 of the differential gear unit PG0 is drivingly coupled to the first rotating electrical machine MG1 so as to rotate with the first rotating electrical machine MG1, the control device 30 detects the rotational speed of the first rotary element RE11 of the differential gear unit PG0 based on the signal received from the first electrical machine rotational speed sensor Se2.

The second electrical machine rotational speed sensor Se3 is a sensor that detects the rotational speed ωmg2 of the second rotating electrical machine MG2. The control device 30 detects the rotational speed ωmg2 (angular velocity) of the second rotating electrical machine MG2 based on the signal received from the second electrical machine rotational speed sensor Se3. Since the third rotary element RE13 of the differential gear unit PG0 and the intermediate input member IM are drivingly coupled to the second rotating electrical machine MG2 so as to rotate with the second rotating electrical machine MG2, the control device 30 detects the rotational speed of the third rotary element RE13 of the differential gear unit PG0 and the rotational speed ωim of the intermediate input member IM based on the signal received from the second electrical machine rotational speed sensor Se3.

The output rotational speed sensor Se4 is a sensor that detects the rotational speed ωo of the output member O. The control device 30 detects the rotational speed ωo (angular velocity) of the output member O based on the signal received from the output rotational speed sensor Se4. Since the rotational speed of the output member O is proportional to the vehicle speed, the control device 30 calculates the vehicle speed based on the signal received from the output rotational speed sensor Se4.

The accelerator operation amount sensor Se5 is a sensor that detects the amount by which an accelerator pedal is operated. The control device 30 detects the accelerator operation amount based on the signal received from the accelerator operation amount sensor Se5.

The shift position sensor Se6 is a sensor that detects the selected position (shift position) of a shift lever that is operated by the driver. The control device 30 detects the shift position based on the signal received from the shift position sensor Se6. The shift lever is configured so that a parking range (P range), a reverse range (R range), a neutral range (N range), a drive range (D range), etc. can be selected. The shift lever is also configured so that shift speed limiting ranges that limit the range of the forward shift speed to be established, such as "2 range" and "L range," can be selected as a kind of D range. The shift lever is also configured so that an "upshift request switch" for sending an upshift request to the shift device TM and a "downshift request switch" for sending a downshift request to the shift device TM can be operated when the D range is being selected.

<Internal Combustion Engine Control Unit 41>

The internal combustion engine control device 31 includes an internal combustion engine control unit 41 that controls operation of the internal combustion engine EN. In the present embodiment, the internal combustion engine control unit 41 performs torque control. Namely, the internal combustion engine control unit 41 controls the output of the internal combustion engine EN in response to torque commands transmitted from other control units etc.

<Rotating Electrical Machine Control Unit 43>

The control device 30 includes a rotating electrical machine control unit 43 that controls operation of the first rotating electrical machine MG1 and the second rotating electrical machine MG2. In the present embodiment, the rotating electrical machine control unit 43 controls the output of each rotating electrical machine MG1, MG2 in response to torque commands transmitted from other control units such as a shift control unit 44. Specifically, the rotating electrical machine control unit 43 controls the output torque of each rotating electrical machine MG1, MG2 by performing on-off control of a plurality of switching elements of the inverter.

2-1. Shift Control Unit 44

The control device 30 includes the shift control unit 44 that performs shift control, namely that changes the speed ratio Keo (also referred to as the speed ratio Keo of the vehicle drive device 1), which is the ratio of the rotational speed ωe of the internal combustion engine EN to the rotational speed ωo of the output member O in the vehicle drive device 1, by changing one or both of the speed ratio Kpg of the differential gear unit PG0 serving as a stepless shift device and the speed ratio Ktm of the shift device TM serving as a stepped shift device.

The speed ratio Keo of the vehicle drive device 1 is a value obtained by dividing the rotational speed ωe of the internal combustion engine EN by the rotational speed ωo of the output member O (Keo=ωe/ωo), and is a value obtained by multiplying the speed ratio Kpg (Kpg=ωe/ωim) of the differential gear unit PG0 by the speed ratio Ktm (Ktm=ωim/ωo) of the shift device TM.

The shift control unit 44 includes a shift device shift control unit 45 and a differential gear shift control unit 46. The shift device shift control unit 45 performs shift device shift control. Namely, the shift device shift control unit 45 changes the speed ratio Keo, which is the ratio of the rotational speed ωe of the internal combustion engine EN to the rotational speed ωo of the output member O, by changing at least the shift speed that is established by the shift device TM.

The differential gear shift control unit 46 performs differential gear shift control. Namely, the differential gear shift control unit 46 changes the speed ratio Keo, which is the ratio of the rotational speed ωe of the internal combustion engine EN to the rotational speed ωo of the output member O, by changing the rotational speeds of the first rotary element RE11 and the second rotary element RE12 of the differential gear unit PG0 without changing the shift speed that is established by the shift device TM.

The differential gear shift control unit 46 performs simulated shift control. Namely, the differential gear shift control unit 46 controls at least the output torques of the first rotating electrical machine MG1 and the second rotating electrical machine MG2 so that a controlled parameter that is controlled during the differential gear shift control, namely at least one of the rotational speed ωe of the internal combustion engine EN and the shift output torque To transmitted from the shift device TM to the output member O, undergoes a change similar to a change in controlled parameter that is controlled during the shift device shift control.

2-1-1. Shift Device Shift Control Unit 45

<Changing of Shift Speed of Shift Device TM>

First, the shift device shift control unit 45 will be described.

The shift device shift control unit 45 performs shift speed changing control. Namely, the shift device shift control unit 45 controls engagement and disengagement of the plurality of engagement devices C1, B1, . . . to change the shift speed that is established by the shift device TM.

In the present embodiment, the shift device shift control unit 45 determines a target shift speed to be established by the shift device TM, based on the sensor detection information such as vehicle speed, accelerator operation amount, and shift position. The shift device shift control unit 45 controls the oil pressures to be supplied to the plurality of engagement devices C1, B1, . . . of the shift device TM via the hydraulic control device PC to engage or disengage the engagement devices C1, B1 . . . so that the shift device TM establishes the target shift speed. Specifically, the shift device shift control unit 45 transmits target oil pressures (oil pressure commands) for each engagement device to the hydraulic control device PC, and the hydraulic control device PC supplies oil pressures corresponding to the received target oil pressures (oil pressure commands) to each engagement device. In the present embodiment, the shift device shift control unit 45 controls the oil pressures to be supplied to each engagement device, by controlling signal values to be supplied to each linear solenoid valve of the hydraulic control device PC.

Figure 5:
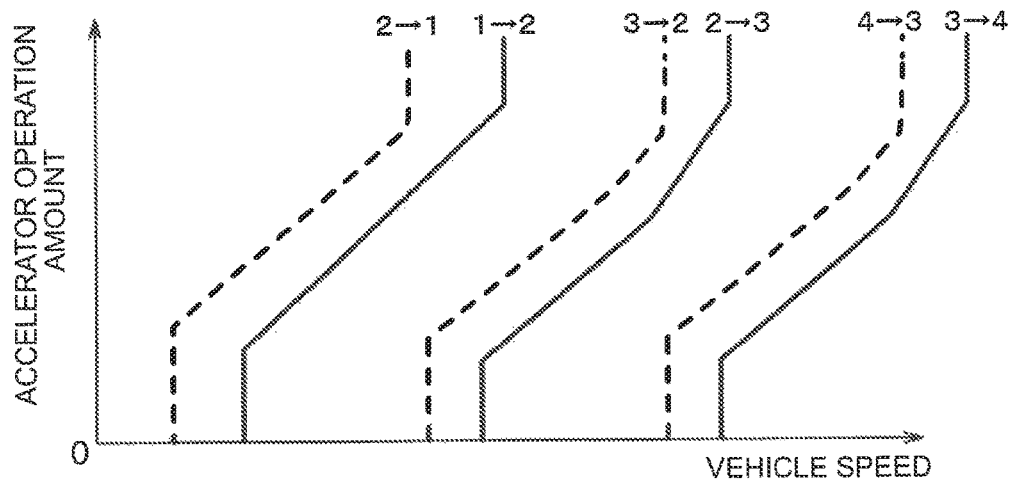
FIG. 5 is a shift map according to the embodiment.

In the present embodiment, the shift device shift control unit 45 determines a target shift speed of the shift device TM by using such a shift map stored in advance in a storage device as shown in FIG. 5. The shift map is a map that defines the relationship between the accelerator operation amount and vehicle speed and the target shift speed of the shift device TM. The shift map includes a plurality of upshift lines (solid lines) and a plurality of downshift lines (dashed lines). When the vehicle speed and the accelerator operation amount change and cross an upshift line or a downshift line on the shift map, the shift device shift control unit 45 determines that a new target shift speed of the shift device TM should be determined to change the shift speed. For simplicity of description, upshift lines and downshift lines for the differential gear shift control are omitted in FIG. 5. The numerals on top of each shift line show the target shift speeds of the shift device TM and do not show imaginary target shift speeds for the differential gear shift control described below.

There is a case where the shift device shift control unit 45 changes the target shift speed when an upshift request or a downshift request is made by the driver by changing the selected position (shift position) of the shift lever. Downshift means a shift from a shift speed with a lower speed ratio to a shift speed with a higher speed ratio, and upshift means a shift from a shift speed with a higher speed ratio to a shift speed with a lower speed ratio.

When the shift speed changing control is performed, the shift device shift control unit 45 controls the oil pressure commands for each engagement device C1, B1, . . . to engage or disengage each engagement device C1, B1, . . . and thus change the shift speed that is established by the shift device TM to a target shift speed. At this time, the shift device shift control unit 45 sets a disengage-side engagement device, which is an engagement device to be disengaged in order to change the shift speed, and an engage-side engagement device, which is an engagement device to be engaged in order to change the shift speed. The shift device shift control unit 45 then performs what is called changeover shifting, namely disengages the disengage-side engagement device and engages the engage-side engagement device, according to a preplanned shift control sequence.

Specifically, the shift device shift control unit 45 sets, as a disengage-side engagement device, an engagement device included in a plurality of engagement devices that establish a shift speed before shifting but not included in a plurality of engagement devices that establish a shift speed after shifting. The shift device shift control unit 45 sets, as an engage-side engagement device, an engagement device included in a plurality of engagement devices that establish a shift speed after shifting but not included in a plurality of engagement devices that establish a shift speed before shifting. The engage-side engagement device is an engagement device that is in a disengaged state before the start of shift control and is to be engaged by the shift control. The disengage-side engagement device is an engagement device that is in an engaged state before the start of shift control and is to be disengaged by the shift control.

For example, as can be seen from the operation table of FIG. 3, in the case where the shift speed before shifting is the first shift speed 1st and the shift speed after shifting is the second shift speed 2nd, the second brake B2 is set as a disengage-side engagement device, and the first brake B1 is set as an engage-side engagement device.

<Change in Speed Ratio Kpg of Differential Gear Unit PG0>

In the present embodiment, when changing the shift speed that is established by the shift device TM, the shift device shift control unit 45 changes the speed ratio Kpg of the differential gear unit PG0 to change the rotational speed ωe of the internal combustion engine EN. When the speed ratio Ktm of the shift device TM is changed to change the rotational speed ωim of the intermediate input member IM, the rotational speed of the third rotary element RE13 of the differential gear unit PG0 which rotates with the intermediate input member IM changes accordingly, and the balance of the rotational speeds of each rotary element of the differential gear unit PG0 changes. Accordingly, the shift device shift control unit 45 changes the speed ratio Kpg of the differential gear unit PG0 so as to achieve optimal distribution of the driving force between the internal combustion engine EN and the second rotating electrical machine MG2 and to achieve an optimal reaction force due to electric power generation of the first rotating electrical machine MG1, while allowing the internal combustion engine EN to operate in an efficient operation range.

In the present embodiment, when performing an upshift of the shift speed of the shift device TM to a shift speed with a lower speed ratio Ktm, the shift device shift control unit 45 increases the speed ratio Kpg of the differential gear unit PG0 within a range in which the speed ratio Keo of the vehicle drive device 1 decreases. Since the speed ratio Keo of the vehicle drive device 1 decreases, the rotational speed ωe of the internal combustion engine EN decreases. When performing a downshift of the shift speed of the shift device TM to a shift speed with a higher speed ratio Ktm, the shift device shift control unit 45 reduces the speed ratio Kpg of the differential gear unit PG0 within a range in which the speed ratio Keo of the vehicle drive device 1 increases. Since the speed ratio Keo of the vehicle drive device 1 increases, the rotational speed ωe of the internal combustion engine EN increases.

2-1-1-1. Example of Upshift

Figure 7:
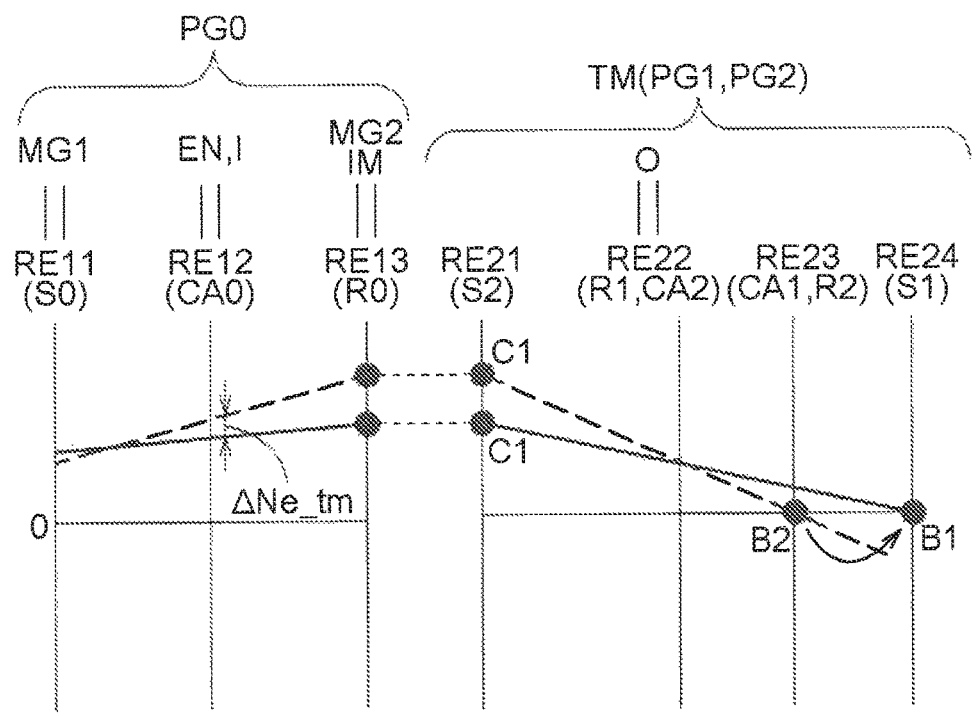
FIG. 7 is a speed diagram illustrating changes that are caused by shift device shift control according to the embodiment.
Figure 8:
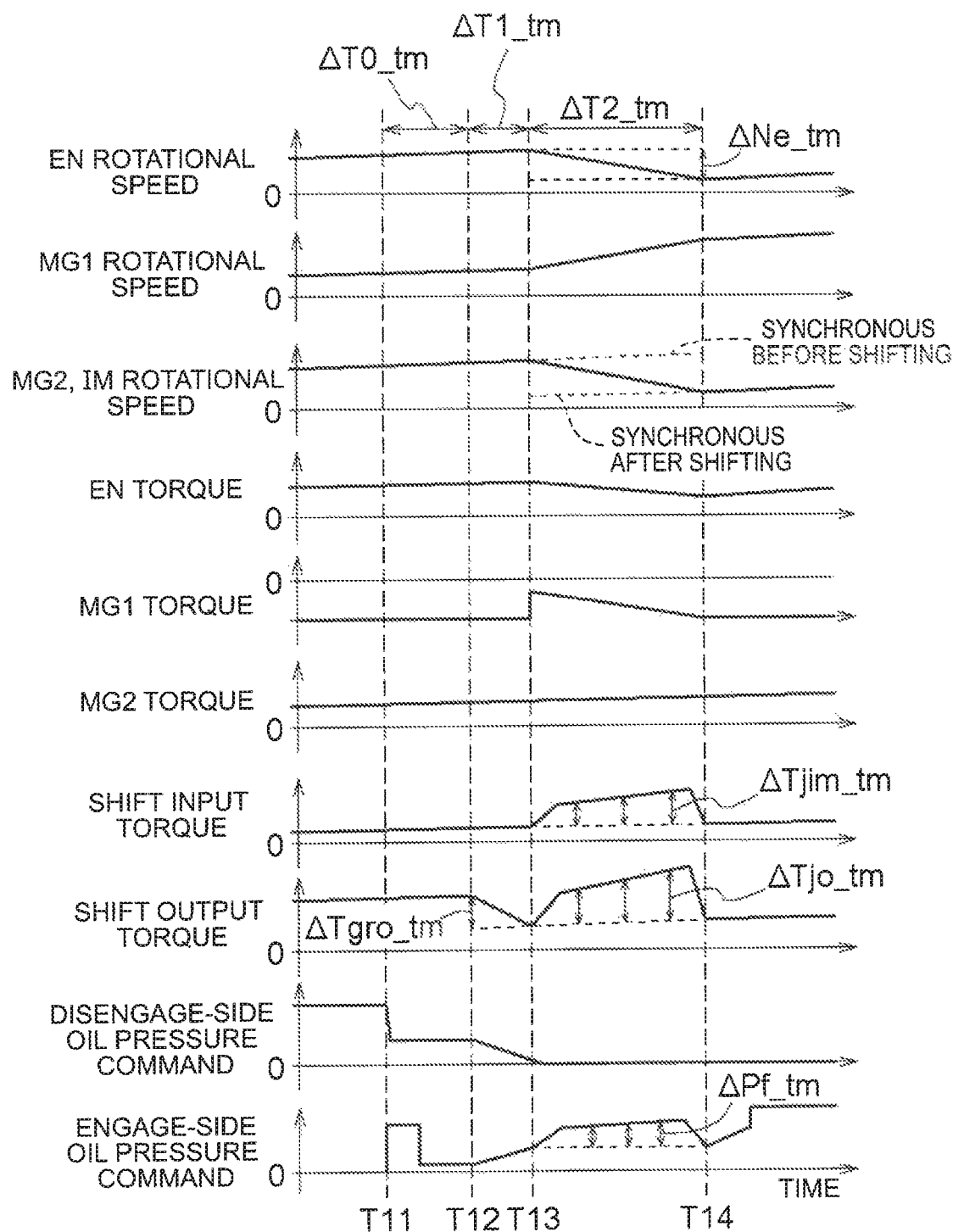
FIG. 8 is a timing chart of the shift device shift control according to the embodiment.

The driver tends to feel a change in rotational speed ωe of the internal combustion engine EN and a change in shift output torque To which occur during the shift device shift control. These changes will be described in detail with respect to an example in which an upshift of the shift speed of the shift device TM is performed by the shift device shift control. FIG. 7 shows changes on a speed diagram which are caused when an upshift from the first shift speed 1st to the second shift speed 2nd is performed. FIG. 8 is a timing chart in the case of performing an upshift of the shift speed of the shift device TM.

The shift device shift control unit 45 starts upshift control of the shift device TM at time T11 in FIG. 8 in the case where a target shift speed has been changed to a shift speed with a lower speed ratio Ktm due to crossing of an upshift line etc. In the case of the upshift from the first shift speed 1st to the second shift speed 2nd shown in FIG. 7, the second brake B2 is set as a disengage-side engagement device, and the first brake B1 is set as an engage-side engagement device.

<Pre-control Phase>

In the present embodiment, as shown in FIG. 8, the shift device shift control unit 45 performs pre-phase control, namely changes in advance the engagement pressures for the disengage-side engagement device and the engage-side engagement device, after the start of the upshift control (from time T11 to time T12).

In the pre-phase control, the shift device shift control unit 45 increases the engagement pressure (oil pressure command) for the engage-side engagement device to the stroke end pressure and reduces the engagement pressure for the disengage-side engagement device from a full engagement pressure to a disengage-side reference pressure. The disengage-side reference pressure is set to an engagement pressure (oil pressure) at which the disengage-side engagement device can transmit the torque of the driving force source being transmitted to the intermediate input member IM before the start of the upshift control (in this example, at the start of the upshift control) toward the output member O. The full engagement pressure is a maximum engagement pressure (oil pressure) that is set in order to maintain engagement with no slipping even if torque that is transmitted from the driving force source to each engagement device varies.

<Torque Phase Control>

After performing the pre-phase control, the shift device shift control unit 45 performs torque phase control, namely increases the engagement pressure of the engage-side engagement device and reduces the engagement pressure of the disengage-side engagement device (from time T12 to time T13). The torque phase control is intended to change the relationship of torques to the state after the upshift control but maintain the relationship of rotational speeds in the state before the upshift control so that the engage-side engagement device is slip-engaged and the disengage-side engagement device is disengaged.

In the torque phase control, the shift device shift control unit 45 gradually increases the engagement pressure (oil pressure command) for the engage-side engagement device to an engage-side reference pressure and gradually reduces the engagement pressure (oil pressure command) for the disengage-side engagement device to the stroke end pressure at which the disengage-side engagement device is disengaged or a pressure lower than the stroke end pressure. The engage-side reference pressure is set to an engagement pressure (oil pressure) at which the engage-side engagement device can transmit the torque of the driving force source being transmitted to the intermediate input member IM before the start of the upshift control (in this example, at the start of the upshift control) toward the output member O.

By the torque phase control, transmission of torque is switched from the disengage-side engagement device to the engage-side engagement device. The shift output torque To that is transmitted from the shift device TM to the output member O therefore decreases by an amount of change $\Delta Tgro\_tm$ corresponding to the decrease in speed ratio Ktm of the shift device TM. Theoretically, the amount of change $\Delta Tgro\_tm$ in shift output torque To in the torque phase control is given by the following expression using the shift input torque Tim that is transmitted from the intermediate input member IM to the shift device TM, the speed ratio Ktmb of the shift speed before upshift, and the speed ratio Ktma of the shift speed after upshift.

$$\Delta Tgro\_tm = Tim(Ktmb - Ktma) \qquad (1)$$

<Inertia Phase Control>

After performing the torque phase control, the shift device shift control unit 45 performs inertia phase control, namely changes rotation so as to increase the rotational speed difference of the disengage-side engagement device and to decrease the rotational speed difference of the engage-side engagement device (from time T13 to time T14). Accordingly, the shift device shift control unit 45 gradually decreases the rotational speed ωim of the intermediate input member IM (the rotational speed ωmg2 of the second rotating electrical machine MG2) from a synchronous rotational speed before shifting to a synchronous rotational speed after shifting. The synchronous rotational speed before shifting is the rotational speed of the intermediate input member IM based on the assumption that the rotational speed difference of the disengage-side engagement device is zero, and is a rotational speed obtained by multiplying the rotational speed ωo of the output member O by the speed ratio Ktmb of the shift speed before upshift. The synchronous rotational speed after shifting is the rotational speed of the intermediate input member IM based on the assumption that the rotational speed difference of the engage-side engagement device is zero, and is a rotational speed obtained by multiplying the rotational speed ωo of the output member O by the speed ratio Ktma of the shift speed after upshift.

The shift device shift control unit 45 increases the engagement pressure (oil pressure command) for the engage-side engagement device from the engage-side reference pressure in order to reduce the rotational speed ωim of the intermediate input member IM in the inertia phase control (from time T113 to time T14). In FIG. 8, $\Delta Pf\_tm$ represents the amount of change in engagement pressure (oil pressure command) for the engage-side engagement device from the engage-side reference pressure. When the engagement pressure for the engage-side engagement device is increased from the engage-side reference pressure, the shift input torque Tim that is transmitted from the intermediate input member IM to the shift device TM via the engage-side engagement device in the slip-engaged state becomes larger than the torque that is transmitted from the driving force source to the intermediate input member IM, and the total torque acting on the inertial system that rotates with the intermediate input member IM becomes negative. The rotational speed ωim of the intermediate input member IM therefore decreases. After increasing the engagement pressure (oil pressure command) for the engage-side engagement device from the engage-side reference pressure, the shift device shift control unit 45 decreases the engagement pressure (oil pressure command) for the engage-side engagement device as the rotational speed ωim of the intermediate input member IM approaches the synchronous rotational speed after shifting, in order for the rotational speed ωim of the intermediate input member IM to decrease gradually. When the rotational speed ωim of the intermediate input member IM decreases to the synchronous rotational speed after shifting, the shift device shift control unit 45 terminates the inertia phase control (time T14). The shift device shift control unit 45 then increases the engagement pressure for the engage-side engagement device to the full engagement pressure and terminates the upshift control (time T14 or later).

In the inertia phase control, the shift output torque To increases by an amount of change $\Delta Tjo\_tm$ corresponding to the amount of change $\Delta Pf\_tm$ in engagement pressure for the engage-side engagement device from the engage-side reference pressure. Theoretically, the amount of change $\Delta Tjo\_tm$ in shift output torque To in the inertia phase control is torque obtained by multiplying an amount of change $\Delta Tjim\_tm$ in shift input torque Tim in the inertia phase control by the speed ratio Ktma of the shift speed after upshift, as given by the following expression $$\Delta Tjo\_tm = \Delta Tjim\_tm \times Ktma \qquad (2)$$

When the rotational speed difference of the engage-side engagement device becomes zero and the engage-side engagement device changes from the slip-engaged state to the direct engaged state, the amount of change $\Delta Tjim\_tm$ in shift input torque Tim decreases to zero even if the engagement pressure for the engage-side engagement device is larger than the engage-side reference pressure.

As described above, the upshift control causes torque variations in shift output torque To. The torque variations can be classified into the amount of change $\Delta Tgro\_tm$ in shift output torque To in the torque phase control and the amount of change $\Delta Tjo\_tm$ in shift output torque To in the inertia phase control.

In the present embodiment, the shift device shift control unit 45 changes the speed ratio Kpg of the differential gear unit PG0 in synchronization with a change in rotational speed of the intermediate input member IM in the inertia phase control so as to gradually reduce the rotational speed $\omega e$ of the internal combustion engine EN by an amount of change $\Delta Ne\_tm$ (from time T13 to time T14). In the present embodiment, the shift device shift control unit 45 changes (increases) the output torque Tmg1 of the first rotating electrical machine MG1.

2-1-2. Differential Gear Shift Control Unit 46

The differential gear shift control unit 46 will be described below.

As described above, the differential gear shift control unit 46 performs differential gear shift control. Namely, the differential gear shift control unit 46 changes the speed ratio Keo, which is the ratio of the rotational speed $\omega e$ of the internal combustion engine EN to the rotational speed $\omega o$ of the output member O, by changing the rotational speeds of the first rotary element RE11 and the second rotary element RE12 of the differential gear unit PG0 without changing the shift speed that is established by the shift device TM.

The differential gear shift control unit 46 performs simulated shift control. Namely, the differential gear shift control unit 46 controls at least the output torques of the first rotating electrical machine MG1 and the second rotating electrical machine MG2 so that a controlled parameter that is controlled during the differential gear shift control, namely at least one of the rotational speed $\omega e$ of the internal combustion engine EN and the shift output torque To transmitted from the shift device TM to the output member O, undergoes a change similar to a change in controlled parameter that is controlled during the shift device shift control.

<Change in Speed Ratio Kpg of Differential Gear Unit PG0>

The differential gear shift control unit 46 controls at least the output torque of the first rotating electrical machine MG1 to change the rotational speed $\omega mg1$ of the first rotating electrical machine MG1 (the first rotary element RE11 of the differential gear unit PG0) and the rotational speed $\omega e$ of the internal combustion engine EN (the second rotary element RE12 of the differential gear unit PG0), thereby changing stepwise the speed ratio Kpg, which is the ratio of the rotational speed $\omega e$ of the internal combustion engine EN (the second rotary element RE12 of the differential gear unit PG0) to the rotational speed $\omega im$ of the intermediate input member IM (the third rotary element RE13 of the differential gear unit PG0).

When the vehicle speed and the accelerator operation amount change, the operation range of the internal combustion engine EN changes. Accordingly, the differential gear shift control unit 46 changes stepwise the speed ratio Kpg of the differential gear unit PG0 so as to achieve optimal distribution of the driving force between the internal combustion engine EN and the second rotating electrical machine MG2 and to achieve an optimal reaction force due to electric power generation of the first rotating electrical machine MG1, while allowing the internal combustion engine EN to operate in an efficient operation range.

In the present embodiment, the differential gear shift control unit 46 determines the speed ratio Kpg of the differential gear unit PG0 based on the sensor detection information such as vehicle speed, accelerator operation amount, and shift position and the shift speed being established by the shift device TM. The shift device shift control unit 45 controls at least the output torque of the first rotating electrical machine MG1 to change the rotational speed $\omega mg1$ of the first rotating electrical machine MG1 and the rotational speed $\omega e$ of the internal combustion engine EN, thereby achieving the target speed ratio Kpg of the differential gear unit PG0.

In the case of performing the differential gear shift control, the shift speeds of the differential gear unit PG0 which are achieved by the differential gear shift control are added to the shift speeds of the shift device TM. When performing the differential gear shift control, the shift control unit 44 sets imaginary shift speeds including the shift speeds of the shift device TM and the shift speeds of the differential gear unit PG0. A target value of the speed ratio Kpg of the differential gear unit PG0 and the shift speed of the shift device TM are set for each imaginary shift speed, and thus the speed ratio Keo of the vehicle drive device 1 is set for each imaginary shift speed.

In the present embodiment, six shift speeds of the differential gear unit PG0 are added to the four shift speeds of the shift device TM. A total of ten imaginary shift speeds are thus set in the present embodiment. These ten imaginary shift speeds are a first imaginary shift speed, a second imaginary shift speed, a third imaginary shift speed, a fourth imaginary shift speed, a fifth imaginary shift speed, a sixth imaginary shift speed, a seventh imaginary shift speed, an eighth imaginary shift speed, a ninth imaginary shift speed, and a tenth imaginary shift speed in descending order of the speed ratio Keo between the internal combustion engine EN and the output member O. For the first imaginary shift speed and the second imaginary shift speed, the shift speed of the shift device TM is set to the first shift speed 1st. For the third imaginary shift speed, the fourth imaginary shift speed, and the fifth imaginary shift speed, the shift speed of the shift device TM is set to the second shift speed 2nd. For the sixth imaginary shift speed, the seventh imaginary shift speed, and the eighth imaginary shift speed, the shift speed of the shift device TM is set to the third shift speed 3rd. For the ninth imaginary shift speed and the tenth imaginary shift speed, the shift speed of the shift device TM is set to the fourth shift speed 4th. As shown by solid upshift lines in the shift map of FIG. 6, in the case of changing the imaginary shift speed between the second imaginary shift speed and the third imaginary shift speed, the shift speed of the shift device TM is changed between the first shift speed 1st and the second shift speed 2nd by the shift device shift control. In the case of changing the imaginary shift speed between the fifth imaginary shift speed and the sixth imaginary shift speed, the shift speed of the shift device TM is changed between the second shift speed 2nd and the third shift speed 3rd by the shift device shift control. In the case of changing the imaginary shift speed between the eighth imaginary shift speed and the ninth imaginary shift speed, the shift speed of the shift device TM is changed between the third shift speed 3rd and the fourth shift speed 4th by the shift device shift control. As shown by alternate long and short dash upshift lines in FIG. 6, in the case of changing the imaginary shift speed between any of the combinations of the imaginary shift speeds other than the combinations described above, the shift speed of the shift device TM is not changed, and only the speed ratio Kpg of the differential gear unit PG0 is changed by the differential gear shift control.

When the shift speed of the shift device TM is changed by the shift device shift control, the speed ratio Kpg of the differential gear unit PG0 is also changed simultaneously, as described above. When the shift speed of the shift device TM is upshifted by the shift device shift control, the speed ratio Kpg of the differential gear unit PG0 is increased (downshifted). The speed ratio Kpg of the differential gear unit PG0 therefore does not continue to decrease due to crossing of an upshift line. Upshift in the differential gear shift control means a decrease in speed ratio Kpg of the differential gear unit PG0, and downshift in the differential gear shift control means an increase in speed ratio Kpg of the differential gear unit PG0.

There is a case where the differential gear shift control unit 46 changes the imaginary shift speed to change the speed ratio Kpg of the differential gear unit PG0, when an upshift request or a downshift request is made by the driver by changing the selected position (shift position) of the shift lever.

When the differential gear shift control is not performed, the shift speed of the shift device TM is changed according to such a shift map as shown in FIG. 5, and the speed ratio Kpg of the differential gear unit PG0 is continuously changed between the upshift lines or between the downshift lines in FIG. 5. In the present embodiment, when a sport mode switch has been turned on by the driver, the shift control unit 44 performs the differential gear shift control and the simulated shift control to change stepwise the speed ratio Kpg of the differential gear unit PG0. When the sport mode switch has been turned off by the driver, the shift control unit 44 does not perform the differential gear shift control and the simulated shift control and continuously changes the speed ratio Kpg of the differential gear unit PG0.

Figure 6:
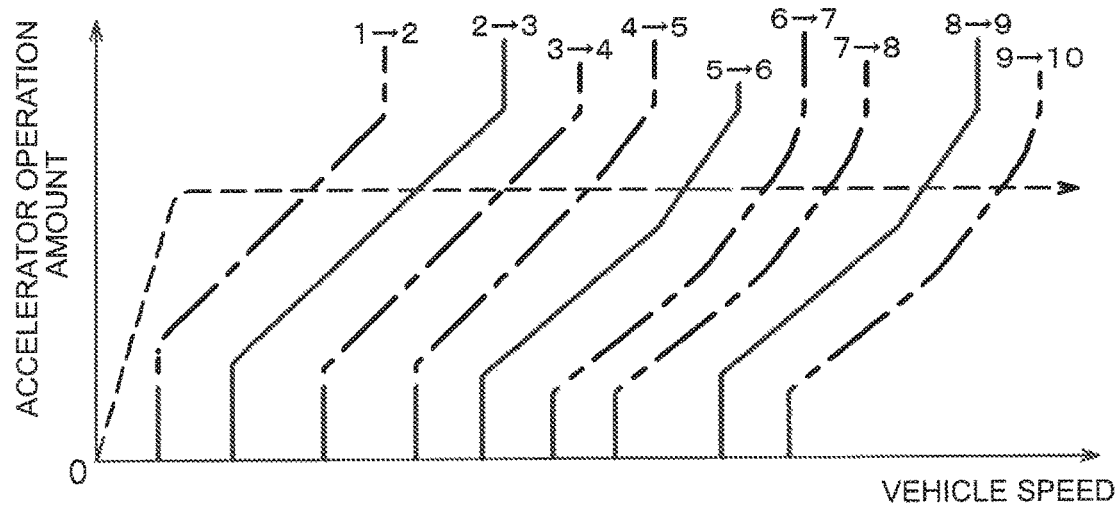
FIG. 6 is a shift map according to the embodiment.

Since the shift speeds of the differential gear unit PG0 of the differential gear shift control are provided, the imaginary shift speed is successively changed as the vehicle is accelerated, as shown by dashed lines in FIG. 6. This allows the driver to more strongly feel acceleration of the vehicle, and thus allows the driver to feel sporty acceleration. However, if a shift feel is different between the case where the shift speed of the shift device TM is changed as shown by the solid upshift lines in FIG. 6 and the case where the shift speed of the shift device TM is not changed and only the speed ratio Kpg of the differential gear unit PG0 is changed as shown by the alternate long and short dash upshift lines in FIG. 6, the driver feels uncomfortable and it is difficult for the driver to feel sporty acceleration. Accordingly, the differential gear shift control unit 46 performs the simulated shift control as described above in order to provide the driver with a shift feel similar to that provided by the shift device shift control in the differential gear shift control as well.

<Simulation of Most Recent Shift Device Shift Control>

In the present embodiment, in the case of accelerating or decelerating the vehicle as shown by dashed lines in FIG. 6, the differential gear shift control unit 46 controls at least the output torques of the first rotating electrical machine MG1 and the second rotating electrical machine MG2 so that a controlled parameter that is controlled during the differential gear shift control undergoes a change similar to a change in controlled parameter controlled during the most recent shift device shift control, in order to provide an improved shift feel.

In an acceleration example shown by a dashed arrow in FIG. 6, in the case of changing the imaginary shift speed from the third imaginary shift speed to the fourth imaginary shift speed (3→4), the differential gear shift control is performed so as to cause a change similar to a change in controlled parameter controlled during the most recent shift device shift control, namely the shift device shift control performed to change the imaginary shift speed from the second imaginary shift speed to the third imaginary shift speed (2→3). In the case of changing the imaginary shift speed from the fourth imaginary shift speed to the fifth imaginary shift speed (4→5), the differential gear shift control is performed so as to cause a change similar to a change in controlled parameter controlled during the most recent shift device shift control, namely the shift device shift control performed to change the imaginary shift speed from the second imaginary shift speed to the third imaginary shift speed (2→3).

When there is no most recent shift device shift control as in the case of changing the imaginary shift speed from the first imaginary shift speed to the second imaginary shift speed (1→2) in the acceleration example shown by the dashed arrow in FIG. 6, the differential gear shift control unit 46 performs the differential gear shift control so as to cause a change similar to a change in controlled parameter controlled during a previous shift device shift control whose speed ratio Keo of the vehicle drive device 1 is close to the speed ratio Keo in the differential gear shift control to be performed (in the example of FIG. 6, the shift device shift control performed to change the imaginary shift speed from the second imaginary shift speed to the third imaginary shift speed (2→3)).

2-1-2-1. Example of Upshift

Figure 9:
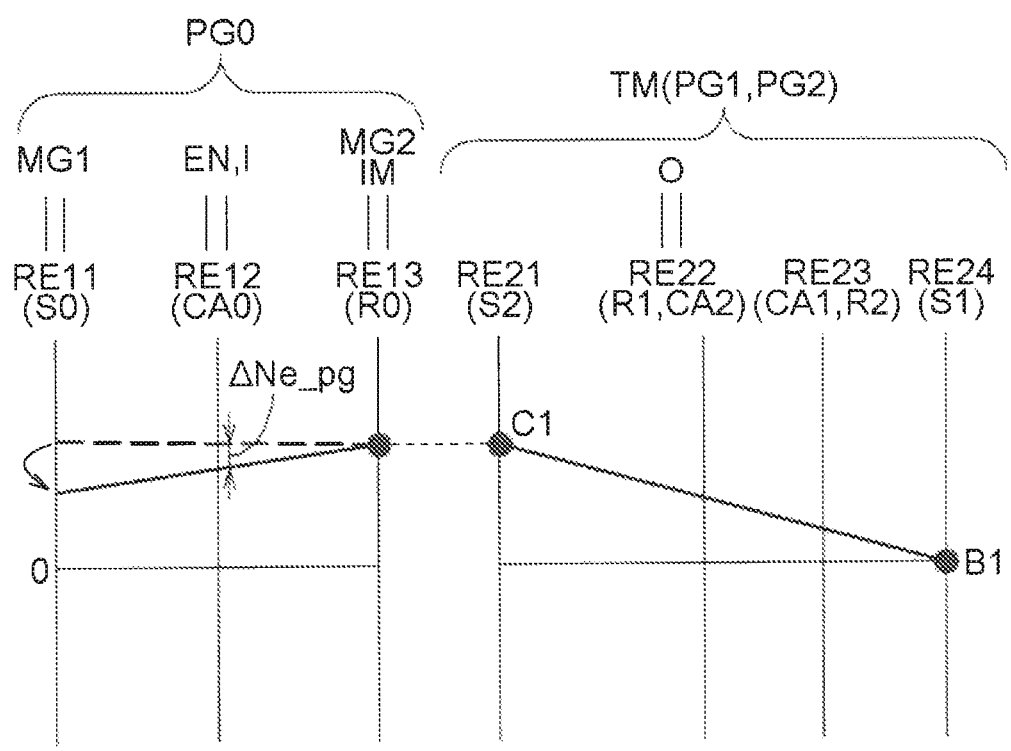
FIG. 9 is a speed diagram illustrating changes that are caused by differential gear shift control according to the embodiment.
Figure 10:
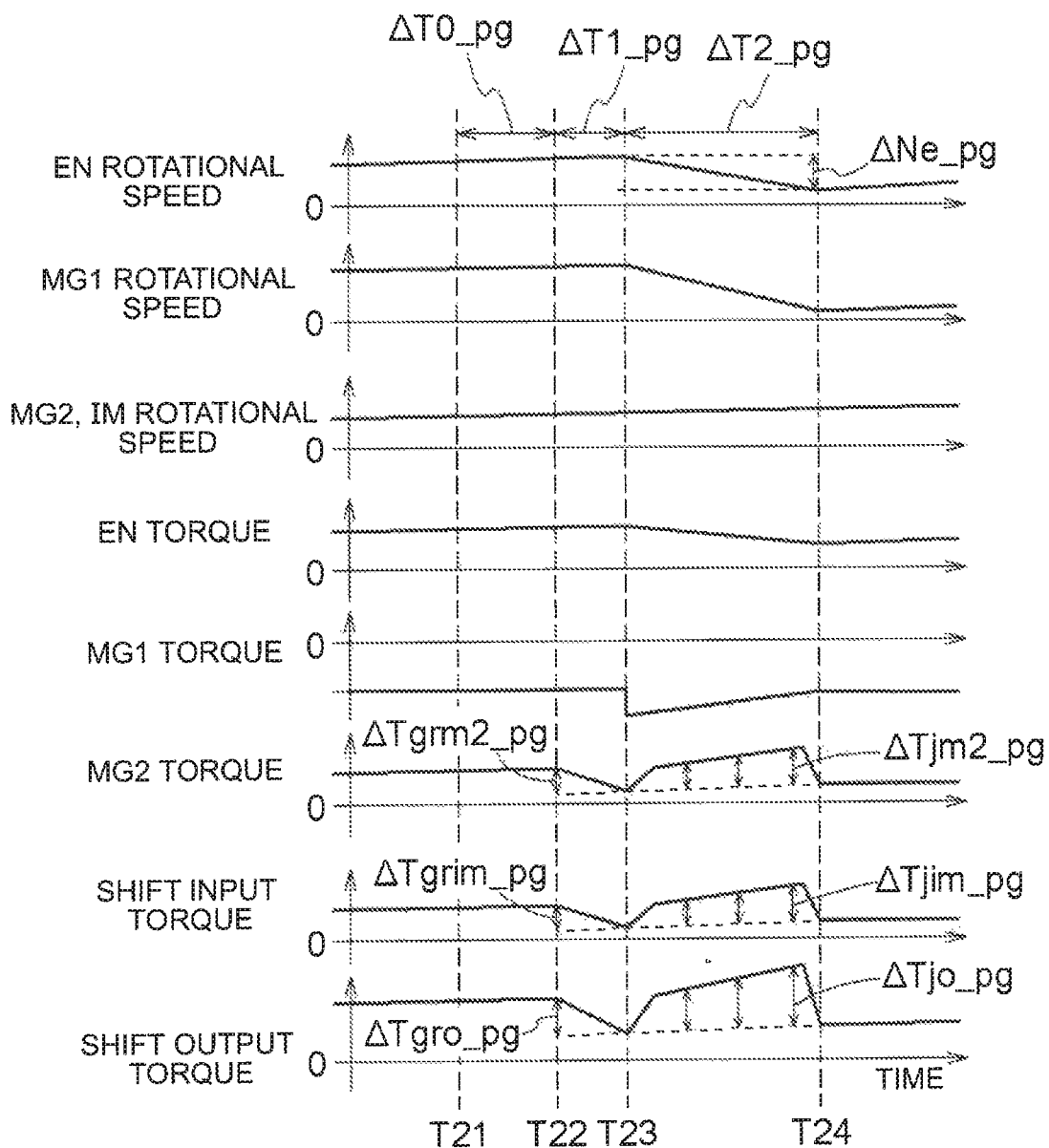
FIG. 10 is a timing chart of the differential gear shift control according to the embodiment.

The differential gear shift control will be described in detail below with respect to an example in which an upshift of the differential gear shift control is performed to reduce the speed ratio Kpg of the differential gear unit PG0. FIG. 9 shows changes on a speed diagram which are caused when an upshift for reducing the speed ratio Kpg of the differential gear unit PG0 is performed with the second shift speed 2nd being established by the shift device TM. FIG. 10 is a timing chart in the case of performing an upshift for reducing the speed ratio Kpg of the differential gear unit PG0.

The differential gear shift control unit 46 starts upshift control of the differential gear unit PG0 at time T21 in FIG. 10 in the case where a target speed ratio of the differential gear unit PG0 has been changed to a lower speed ratio due to crossing of an upshift line etc. In the present embodiment, both the rotational speed ωe of the internal combustion engine EN and the shift output torque To during the differential gear shift control are controlled parameters.

<Simulation of Pre-phase Control>

In the present embodiment, as shown in FIG. 10, the differential gear shift control unit 46 simulates the pre-phase control of the shift device shift control after the start of the upshift control (from time T21 to time T22). Specifically, there is a simulated period $\Delta T0\_pg$ corresponding to a period $\Delta T0\_tm$ of the pre-phase control in order to provide a delay period before the differential gear shift control is actually started after it is determined that the upshift control should be started. For example, $\Delta T0\_pg=\Delta T0\_tm$. Providing the simulated period $\Delta T0\_pg$ of the pre-phase control allows the driver to feel a delay in start of shifting which is similar to the delay that occurs in the shift device control device.

<Simulation of Torque Phase Control>

After the simulated period $\Delta T0\_pg$ of the pre-phase control, the differential gear shift control unit 46 performs control to simulate a change in shift output torque To which occurs in the torque phase control of the shift device shift control (from time T22 to time T23). As described above by using FIG. 8 and the expression (1), in the torque phase control of the shift device shift control, the shift output torque To gradually decreases by the amount of change $\Delta Tgro\_tm$ corresponding to the change in speed ratio Ktm of the shift device TM during a period $\Delta T1\_tm$ of the torque phase control. The differential gear shift control unit 46 gradually (in this example, with a constant gradient) reduces the shift output torque To by a simulated amount of change $\Delta Tgro\_pg$ of the torque phase control corresponding to the amount of change $\Delta Tgro\_tm$ in shift output torque To in the torque phase control, during a simulated period $\Delta T1\_pg$ of the torque phase control corresponding to the period $\Delta T1\_tm$ of the torque phase control (from time T22 to time T23). For example, $\Delta T1\_pg=\Delta T1\_tm$, and $\Delta Tgro\_pg=\Delta Tgro\_tm$.

In the present embodiment, the differential gear shift control unit 46 reduces the shift output torque To by the simulated amount of change $\Delta Tgro\_pg$ from the shift output torque To before the start of the simulated period of the torque phase control.

In the present embodiment, the differential gear shift control unit 46 gradually (in this example, with a constant gradient) reduces the output torque of the second rotating electrical machine MG2 by a simulated amount of change $\Delta Tgrm2\_pg$ corresponding to the simulated amount of change $\Delta Tgro\_pg$ of the torque phase control, during the simulated period $\Delta T1\_pg$ of the torque phase control. In the present embodiment, the differential gear shift control unit 46 gradually reduces the output torque of the second rotating electrical machine MG2 by the simulated amount of change $\Delta Tgrm2\_pg$ from the output torque of the second rotating electrical machine MG2 before the start of the simulated period of the torque phase control.

The amount of change $\Delta Tgrm2\_pg$ in output torque of the second rotating electrical machine MG2 is transmitted to the shift device TM as an amount of change $\Delta Tgrim\_pg$ in shift input torque Tim, and toque is converted according to the speed ratio Ktm of the shift speed of the shift device TM and is transmitted to the output member O. Accordingly, the differential gear shift control unit 46 calculates the amount of change $\Delta Tgrm2\_pg$ in output torque of the second rotating electrical machine MG2 by dividing the simulated amount of change $\Delta Tgro\_pg$ in shift output torque To by the speed ratio Ktm of the shift speed of the shift device TM, as given by the following expression.

$$\Delta Tgrm2\_pg=\Delta Tgro\_pg/Ktm \qquad (3)$$

<Simulation of Inertia Phase Control>

The differential gear shift control unit 46 performs control to simulate an increase in shift output torque To in the inertia phase control of the shift device shift control after the simulated period $\Delta T1\_pg$ of the torque phase control (from time T23 to time T24). As described above by using FIG. 8 and the expression (2), in the inertia phase control of the shift device shift control, the shift output torque To increases by the amount of change $\Delta Tjo\_tm$ corresponding to the amount of change $\Delta Pf\_tm$ in engagement pressure for the engage-side engagement device from the engage-side reference pressure during a period $\Delta T2\_tm$ of the inertia phase control. The differential gear shift control unit 46 increases the shift output torque To by a simulated amount of change $\Delta Tjo\_pg$ of the inertia phase control corresponding to the amount of change $\Delta Tjo\_tm$ in shift output torque To in the inertia phase control, during a simulated period $\Delta T2\_pg$ of the inertia phase control corresponding to the period $\Delta T2\_tm$ of the inertia phase control (from time T23 to time T24). For example, $\Delta T2\_pg=\Delta T2\_tm$, and $\Delta Tjo\_pg=\Delta Tjo\_tm$.

In the present embodiment, the differential gear shift control unit 46 increases the shift output torque To by the simulated amount of change $\Delta Tjo\_pg$ from the value of the shift output torque To reduced during the simulated period of the torque phase control, and then reduces the increased shift output torque To back to the value of the shift output torque To reduced during the simulated period of the torque phase control. The simulated amount of change $\Delta Tjo\_pg$ of the inertia phase control is a function of time. For example, the relationship between the time elapsed after the start of the inertia phase control and the simulated amount of change $\Delta Tjo\_pg$ of the inertia phase control is stored in a map. The differential gear shift control unit 46 uses this map to set the simulated amount of change $\Delta Tjo\_pg$ of the inertia phase control based on the elapsed time of the simulated period of the inertia phase control.

In the present embodiment, the output torque of the second rotating electrical machine MG2 is increased by a simulated amount of change $\Delta Tjm2\_pg$ corresponding to the simulated amount of change $\Delta Tjo\_pg$ of the inertia phase control, during the simulated period $\Delta T2\_pg$. A change in shift output torque To, which is a controlled parameter, is a change in shift output torque To which occurs while the rotational speed $\omega e$ of the internal combustion engine EN is changing. In the present embodiment, the differential gear shift control unit 46 increases the output torque of the second rotating electrical machine MG2 by the simulated amount of change $\Delta Tjm2\_pg$ from the value of the output torque of the second rotating electrical machine MG2 reduced during the simulated period of the torque phase control, and then reduces the increased output torque of the second rotating electrical machine MG2 back to the value of the output torque of the second rotating electrical machine MG2 reduced during the simulated period of the torque phase control. The simulated amount of change $\Delta Tjm2\_pg$ of the inertia phase control is a function of time. For example, the relationship between the time elapsed after the start of the inertia phase control and the simulated amount of change $\Delta Tjm2\_pg$ of the inertia phase control is stored in a map. The differential gear shift control unit 46 uses this map to set the simulated amount of change $\Delta Tjm2\_pg$ of the inertia phase control based on the elapsed time of the simulated period of the inertia phase control.

The simulated amount of change $\Delta Tjm2\_pg$ of the second rotating electrical machine MG2 is transmitted to the shift device TM as an amount of change $\Delta Tjim\_pg$ in shift input torque Tim, and toque is converted according to the speed ratio Ktm of the shift speed of the shift device TM and is transmitted to the output member O. Accordingly, the differential gear shift control unit 46 calculates the amount of change $\Delta Tjm2\_pg$ of the second rotating electrical machine MG2 by dividing the simulated amount of change $\Delta Tjo\_pg$ in shift output torque To by the speed ratio Ktm of the shift speed of the shift device TM, as given by the following expression.

$$\Delta Tjm2\_pg = \Delta Tjo\_pg/Ktm \qquad (4)$$

The differential gear shift control unit 46 performs control to simulate a decrease in rotational speed $\omega e$ of the internal combustion engine EN in the inertia phase control of the shift device shift control after the simulated period $\Delta T1\_pg$ of the torque phase control (from time T23 to time T24). As described above by using FIG. 8, in the shift device shift control, the rotational speed $\omega e$ of the internal combustion engine EN gradually decreases by the amount of change $\Delta Ne\_tm$ during the period $\Delta T2\_tm$ of the inertia phase control. The differential gear shift control unit 46 gradually (in this example, with a constant gradient) reduces the rotational speed $\omega e$ of the internal combustion engine EN by a simulated amount of change $\Delta Ne\_pg$ corresponding to the amount of change $\Delta Ne\_tm$ of the inertia phase control, during the simulated period $\Delta T2\_pg$ of the inertia phase control corresponding to the period $\Delta T2\_tm$ of the inertia phase control (from time T23 to time T24). For example, $\Delta T2\_pg=\Delta T2\_tm$, and $\Delta Ne\_pg=\Delta Ne\_tm$. That is, a change in rotational speed $\omega e$ of the internal combustion engine EN, which is a controlled parameter, is the amount of change $\Delta Ne\_pg$ in rotational speed $\omega e$ of the internal combustion engine EN and the period $\Delta T2\_pg$ in which the rotational speed $\omega e$ of the internal combustion engine EN changes.

In the present embodiment, the differential gear shift control unit 46 reduces the output torque of the first rotating electrical machine MG1 and the output torque of the internal combustion engine EN to reduce the rotational speed $\omega mg1$ of the first rotating electrical machine MG1 and the rotational speed $\omega e$ of the internal combustion engine EN, thereby reducing the speed ratio Kpg of the differential gear unit PG0.

2-1-2-2. Simulated Shift control Based on Recorded Value during Shift Device Shift Control The differential gear shift control unit 46 records a change in controlled parameter that is controlled during the shift device shift control, and performs simulated shift control, namely controls at least the output torques of the first rotating electrical machine MG1 and the second rotating electrical machine MG2 so that a controlled parameter that is controlled during the differential gear shift control undergoes a change similar to the change in controlled parameter recorded during the shift device shift control.

The differential gear shift control unit 46 records the period $\Delta T0\_tm$ of the pre-phase control, the period $\Delta T1\_tm$ of the torque phase control, and the period $\Delta T2\_tm$ of the inertia phase control during such shift device shift control as shown in FIG. 8.

The differential gear shift control unit 46 also records the amount of change $\Delta Tgro\_tm$ in shift output torque To in the torque phase control during such shift device shift control as shown in FIG. 8. Specifically, the differential gear shift control unit 46 estimates $\Delta Tgro\_tm$ based on the expression (1) by using the shift input torque Tim before the start of the torque phase control and the speed ratios Ktmb, Ktma of the shift speeds before and after the shift device shift control, and records the estimated value $\Delta Tgro\_tm$. The shift input torque Tim before the start of the torque phase control can be regarded as required vehicle torque. The control device 30 calculates the required vehicle torque, which is torque required to drive the wheels W and a target driving force to be transmitted from the intermediate input member IM to the output member O, according to the accelerator operation amount, the vehicle speed, the amount of charge in the battery, etc., and controls the output torque of each driving force source so as to achieve the required vehicle torque.

The differential gear shift control unit 46 estimates the shift input torque Tim during such inertia phase control (from time T13 to time T14) as shown in FIG. 8, and calculates the amount of change $\Delta Tjim\_tm$ in shift input torque Tim in the inertia phase control, based on the estimation result. The differential gear shift control unit 46 estimates the amount of change $\Delta Tjo\_tm$ in shift output torque To in the inertia phase control based on the expression (2) by using the calculated amount of change $\Delta Tjim\_tm$ and the speed ratio Ktma of the shift speed after shifting, and records the estimated amount of change $\Delta Tjo\_tm$.

2-1-2-2-1. Estimation by Physical Model The shift input torque Tim during the inertia phase control can be estimated by using a physical model of an inertial system and a planetary gear unit.

In the inertia phase control, the engage-side engagement device is slip-engaged, whereby an inertial system on the intermediate input member IM side of the engage-side engagement device and an inertial system on the output member O side of the engage-side engagement device become independent of each other. Namely, the inertial system that rotates with the intermediate input member IM is disengaged from the inertial system on the output member O side of the engage-side engagement device, so that these inertial systems become independent of each other.

Equations of motion of a first inertial system that rotates with the first rotating electrical machine MG1 (the first rotary element RE11 of the differential gear unit PG0), a second inertial system that rotates with the internal combustion engine EN (the second rotary element RE12 of the differential gear unit PG0), and a third inertial system that rotates with the second rotating electrical machine MG2 and the intermediate input member IM (the third rotary element RE13 of the differential gear unit PG0) are given by the following expressions.

$$Jmg1 \times (d\omega mg1/dt) = Tmg1 - Tre11 \qquad (5)$$

$$Je \times (d\omega e/dt) = Te - Tre12 \qquad (6)$$

$$Jmg2 \times (d\omega mg2/dt) = Tmg2 - Tre13 - Tim \qquad (7)$$

In the expressions, Jmg1 represents the moment of inertia of the first inertial system that rotates with the first rotating electrical machine MG1 (the first rotary element RE11 of the differential gear unit PG0), Je represents the moment of inertia of the second inertial system that rotates with the internal combustion engine EN (the second rotary element RE12 of the differential gear unit PG0), and Jmg2 represents the moment of inertia of the third inertial system that rotates with the second rotating electrical machine MG2 and the intermediate input member IM (the third rotary element RE13 of the differential gear unit PG0). Tmg1 represents the output torque of the first rotating electrical machine MG1, Te represents the output torque of the internal combustion engine EN, and Tmg2 represents the output torque of the second rotating electrical machine MG2. Tre11 represents the reaction torque that is applied from the differential gear unit PG0 to the first inertial system, Tre12 represents the reaction torque that is applied from the differential gear unit PG0 to the second inertial system, and Tre13 represents the reaction torque that is applied from the differential gear unit PG0 to the third inertial system. Tim represents the torque that is applied from the intermediate input member IM to the shift device TM and that is transmitted from the third inertial system associated with the intermediate input member IM to the inertial system on the output member O side via the engage-side engagement device in a slip-engaged state.

The static torque balance in the differential gear unit PG0 based on the "principle of leverage" is given by the following expressions.

$$(1+\lambda 0) \times Tre11 + \lambda 0 \times Tre12 = 0 \quad (8)$$

$$Tre11 - \lambda 0 \times Tre13 = 0 \quad (9)$$

$$(1+\lambda 0) \times Tre13 + Tre12 = 0 \quad (10)$$

In the expressions, $\lambda 0$ represents the ratio of the number of teeth between the sun gear S0 and the ring gear R0 (=[the number of teeth of the sun gear S0]/[the number of teeth of the ring gear R0]) of the differential gear unit PG0, as shown in FIG. 2.

The following expression is obtained by rearranging the expression (8) for Tre12 and substituting the resultant expression for Tre12 in the expression (10).

$$Tre13 - (1/\lambda 0) \times Tre11 = 0 \quad (11)$$

The following expression is obtained by rearranging the expression (5) for Tre11, rearranging the expression (7) for Tre13, and substituting the resultant expressions for Tre11 and Tre13 in the expression (11).

$$Tim = Tmg2 - Jmg2 \times (d\omega mg2/dt) - (1/\lambda 0) \times (Tmg1 - Jmg1 \times (d\omega mg1/dt)) \quad (12)$$

The differential gear shift control unit 46 estimates the shift input torque Tim by using the expression (12), based on the moment of inertia Jmg1 of the first inertial system, the moment of inertia Jmg2 of the third inertial system, and the gear ratio $\lambda 0$, which are identified and stored in advance, and the detected output torque Tmg1 and rotational speed $\omega mg1$ of the first rotating electrical machine MG1 and the detected output torque Tmg2 and rotational speed $\omega mg2$ of the second rotating electrical machine MG2.

Alternatively, the following expression can be obtained from the expressions (8), (9), and (10).

$$Tre11 + Tre12 + Tre13 = 0 \quad (13)$$

The following expression is obtained by substituting the expression (5) rearranged for Tre11, the expression (6) rearranged for Tre12, and the expression (7) rearranged for Tre13 for the Tre11, Tre12, and Tre13 in the expression (13).

$$Tim = Tmg1 - Jmg1 \times (d\omega mg1/dt) + Te - Jex(d\omega e/dt) + Tmg2 - Jmg2 \times (d\omega mg2/dt) \quad (14)$$

The differential gear shift control unit 46 may estimate the shift input torque Tim by using the expression (14), based on the moment of inertia Jmg1 of the first inertial system, the moment of inertia Je of the second inertial system, and the moment of inertia Jmg2 of the third inertial system, which are identified and stored in advance, and the detected output torque Tmg1 and rotational speed $\omega mg1$ of the first rotating electrical machine MG1, the detected output torque Tmg2 and rotational speed $\omega mg2$ of the second rotating electrical machine MG2, and the detected output torque Te and rotational speed $\omega e$ of the internal combustion engine EN.

The differential gear shift control unit 46 uses the shift input torque Tim estimated before the start of the inertia phase control (during the torque phase control) as a reference value, and calculates a variation in estimated shift input torque Tim from the reference value as the amount of change $\Delta Tjim\_tm$. The differential gear shift control unit 46 calculates the amount of change $\Delta Tjo\_tm$ in shift output torque To in the inertia phase control, based on the expression (2).

The differential gear shift control unit 46 stores the estimated amount of change $\Delta Tjo\_tm$ in shift output torque Tmo in the inertia phase control in every predetermined sampling period as time passes after the start of the inertia phase control, and stores the amount of change $\Delta Tjo\_tm$ as a function of time.

2-1-2-2-2. Estimation by Engagement Pressure of Engage-Side Engagement Device

The shift output torque To that is transmitted to the output member O via the engage-side engagement device in a slip-engaged state changes according to the engagement pressure (oil pressure command) for the engage-side engagement device. The differential gear shift control unit 46 uses a characteristic map storing in advance the relationship between the engagement pressure (oil pressure command) for the engagement device selected as the engage-side engagement device and the shift output torque Tmo that is transmitted to the output member O via the engage-side engagement device in a slip-engaged state, and estimates the shift output torque To that is transmitted to the output member O via the engage-side engagement device in a slip-engaged state, based on the oil pressure command for the engage-side engagement device. The shift output torque Tmo stored in the characteristic map is set based on transfer torque (transfer torque capacity) of the engagement device and the gear ratio between the engagement device and the output member O. An oil pressure command for the engage-side engagement device which has been subjected to response delay processing such as a first-order lag may be used in order to simulate response delay of an actual oil pressure.

The differential gear shift control unit 46 uses the shift output torque To estimated before the start of the inertia phase control as a reference value, and calculates a variation in estimated shift output torque To from the reference value as the amount of change $\Delta Tjo\_tm$. The differential gear shift control unit 46 stores the estimated amount of change $\Delta Tjo\_tm$ in shift output torque Tmo in the inertia phase control in every predetermined sampling period as time passes after the start of the inertia phase control, and stores the amount of change $\Delta Tjo\_tm$ as a function of time.

2-1-2-3. Simulated Shift Control Based on Preset Change Pattern

The differential gear shift control unit 46 may control at least the output torques of the first rotating electrical machine MG1 and the second rotating electrical machine MG2 based on a change pattern that is preset so that a controlled parameter that is controlled during the differential gear shift control undergoes a change similar to a change in controlled parameter that is controlled during the shift device shift control.

Changes in controlled parameters that are controlled during the shift device shift control such as the periods $\Delta T0\_tm$, $\Delta T1\_tm$, $\Delta T2\_tm$ of each phase control, the amounts of change $\Delta Tgro\_tm$, $\Delta Tjo\_tm$ in shift output torque To, and the amount of change $\Delta Ne\_tm$ in rotational speed $\omega e$ of the internal combustion engine EN are recorded in advance by experiments etc. Change patterns of the simulated periods $\Delta T0\_pg$, $\Delta T1\_pg$, $\Delta T2\_pg$ of each phase control, the simulated amounts of change $\Delta Tgro\_pg$, $\Delta Tjo\_pg$ in shift output torque To, and the simulated amount of change $\Delta Ne\_pg$ in rotational speed toe of the internal combustion engine EN during the differential gear shift control are set in advance based on the recorded changes in controlled parameters, and stored in the storage device.

In the present embodiment, a plurality of change patterns are provided for every predetermined vehicle driving condition, and the differential gear shift control unit 46 controls at least the output torques of the first rotating electrical machine MG1 and the second rotating electrical machine MG2 based on the change pattern selected according to the vehicle driving condition corresponding to the driving condition of the vehicle.

In the present embodiment, the driving condition of the vehicle is the driving condition of the vehicle at the time the shift device shift control is performed. The vehicle driving condition is one or more of conditions during the shift device shift control such as the vehicle speed, the accelerator operation amount, each speed ratio such as the speed ratio Keo of the vehicle drive device 1 or the speed ratio Ktm of the shift device TM, the amount of change in each speed ratio such as the speed ratio Keo of the vehicle drive device 1 or the speed ratio Ktm of the shift device TM, and the rates of change in engagement pressure for the engage-side engagement device and the disengage-side engagement device, the mileage for predicting aging of the shift device TM, production variation of the shift device TM measured and instrumented before shipment, etc.

Alternatively, the driving condition of the vehicle may be the driving condition of the vehicle at the time the differential gear shift control is performed. In this case, the vehicle driving condition is one or more of conditions during the differential gear shift control such as the vehicle speed, the accelerator operation amount, each speed ratio such as the speed ratio Keo of the vehicle drive device 1 or the speed ratio Kpg of the differential gear unit PG0, and the amount of change in each speed ratio such as the speed ratio Keo of the vehicle drive device 1 or the speed ratio Kpg of the differential gear unit PG0, the mileage for predicting aging of the shift device TM, production variation of the shift device TM measured and instrumented before shipment, etc.

2-1-2-4. Change in Controlled Parameter According to Amount of Change in Speed Ratio Keo The differential gear shift control unit 46 may set the amount of change in speed ratio Keo of the vehicle drive device 1 which is to be changed in the differential gear shift control, so that a change in controlled parameter which is caused during the differential gear shift control varies according to the amount of change in speed ratio Keo.

A change in controlled parameter in the shift device shift control increases as the amount of change in speed ratio Keo of the vehicle drive device 1 in the shift device shift control increases. Accordingly, the differential gear shift control unit 46 may increase a change in controlled parameter to be caused during the differential gear shift control, as the amount of change in speed ratio Keo of the vehicle drive device 1 in the differential gear shift control increases. For example, the differential gear shift control unit 46 increases the simulated amount of change $\Delta Tgro\_pg$ and the simulated amount of change $\Delta Tjo\_pg$ in shift output torque To, the simulated amount of change $\Delta Ne\_pg$ in rotational speed ωe of the internal combustion engine EN, etc. as the amount of change in speed ratio Keo of the vehicle drive device 1 increases.

The differential gear shift control unit 46 may set a change in controlled parameter according to the ratio of the amount of change in speed ratio Keo of the vehicle drive device 1 in the differential gear shift control to be performed to the amount of change in speed ratio Keo of the vehicle drive device 1 in the shift device shift control to be simulated, or according to the difference between the amount of change in speed ratio Keo of the vehicle drive device 1 in the differential gear shift control to be performed and the amount of change in speed ratio Keo of the vehicle drive device 1 in the shift device shift control to be simulated. That is, the differential gear shift control unit 46 may set a change in controlled parameter to be caused during the differential gear shift control to be performed, by increasing or decreasing a change in controlled parameter which is caused during the shift device shift control to be simulated according to such a ratio or difference of the amount of change. For example, the differential gear shift control unit 46 sets $\Delta Tjo\_pg = Keodiff \times \Delta Tjo\_tm$, $\Delta Tgro\_pg = Keodiff \times \Delta Tgro\_tm$, and $\Delta Ne\_pg = Keodiff \times \Delta Ne\_tm$. Keodiff represents the ratio of the amount of change Keo2 in speed ratio Keo of the vehicle drive device 1 in the differential gear shift control to be executed to the amount of change Keo1 in speed ratio Keo of the vehicle drive device 1 in the shift gear shift control to be simulated (Keodiff=Keo2/Keo1).

2-1-3. Flowchart

Figure 11:
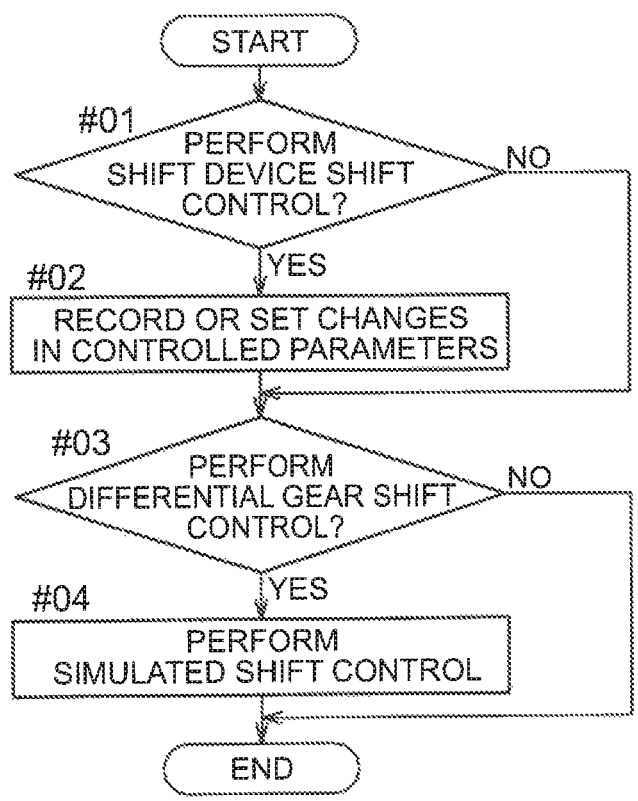
FIG. 11 is a flowchart of the shift device shift control and the differential gear shift control according to the embodiment.

Processing that is performed by the shift device shift control unit 45 and the differential gear shift control unit 46 will be described below with reference to the flowchart of FIG. 11.

If the shift device shift control unit 45 determines that the shift device shift control should be performed due to crossing of an upshift line for the shift device shift control etc. (step #01: Yes), the shift device shift control unit 45 performs the shift device shift control, and the differential gear shift control unit 46 records changes in controlled parameters which are caused during the shift device shift control, or sets change patterns similar to the changes in control parameters which are caused during the shift device shift control (step #02).

If the differential gear shift control unit 46 determines that the differential gear shift control should be performed due to crossing of an upshift line for the differential gear shift control etc. (step #03: Yes), the differential gear shift control unit 46 performs the differential gear shift control and performs the simulated shift control during the differential gear shift control (step #04).

Other Embodiments

Other embodiments of the vehicle drive device will be described below. The configuration of each embodiment described below may not only be used by itself, but also be used in combination with any of the configurations of the other embodiments unless inconsistency arises.

(1) The above embodiment is described with respect to an example in which the control device 30 includes the plurality of functional units 43 to 46. However, the present disclosure is not limited to this. The control device 30 may include a plurality of control units, and the plurality of control units may include the plurality of functional units 43 to 45.

(2) The above embodiment is described with respect to an example in which the shift device TM has two planetary gear units, five engagement devices, and four forward shift speeds, and each shift speed is established by engagement of two engagement devices. However, the present disclosure is not limited to this. The shift device TM may have any configuration as long as it has two or more shift speeds that are established by engagement of at least one engagement device. Namely, the shift device TM may have two or more planetary gear units or one planetary gear unit. The shift device TM may have any number of engagement devices and any number of shift speeds. The shift device TM may establish each shift speed by engaging one engagement device or may establish each shift speed by engaging three or more engagement devices.

Figure 13:
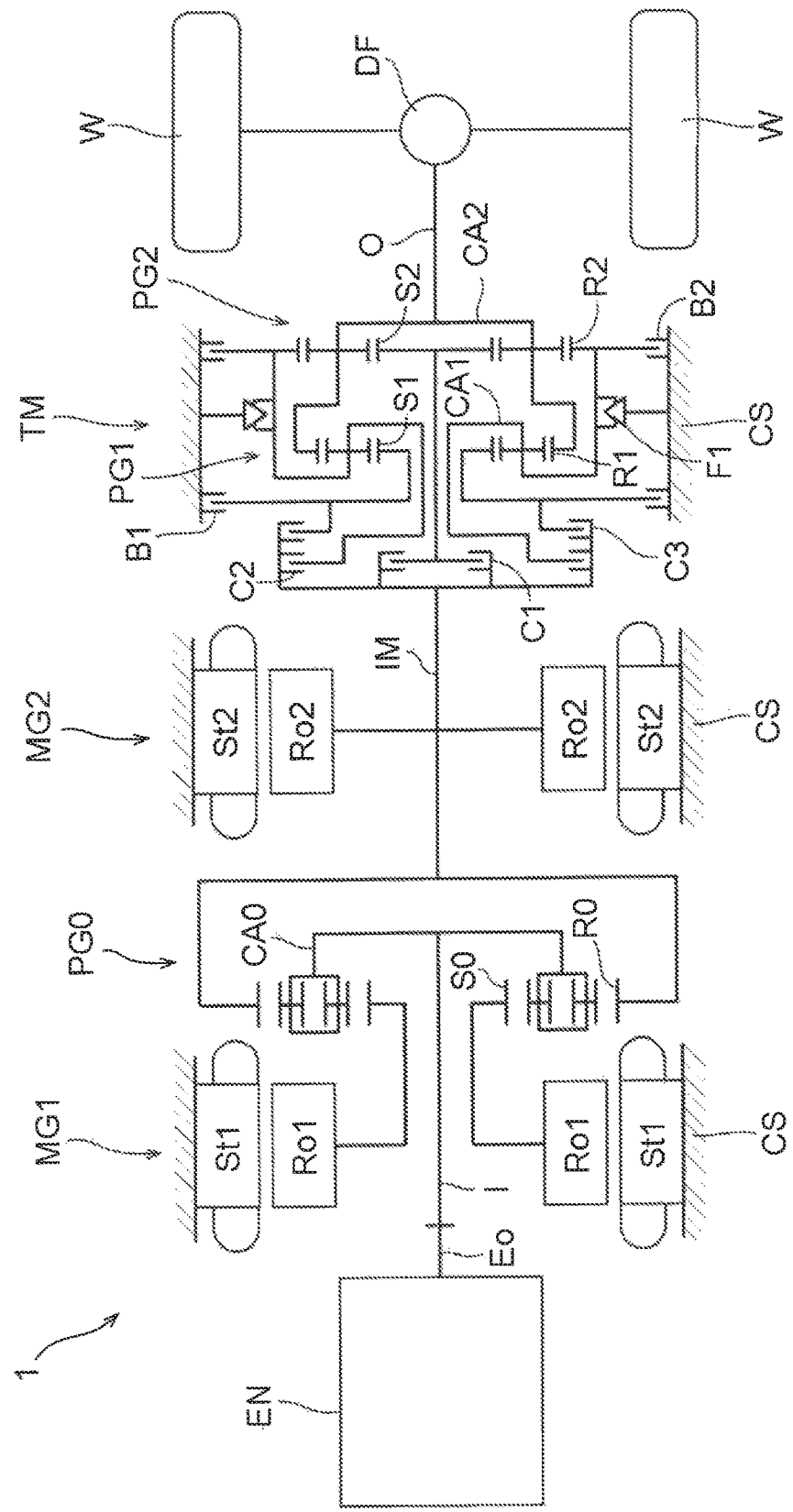
FIG. 13 is a skeleton diagram of a vehicle drive device according to still another embodiment.

(3) The above embodiment is described with respect to an example in which the first rotating electrical machine MG1 is drivingly coupled to the first rotary element RE11 of the differential gear unit PG0, the internal combustion engine EN is drivingly coupled to the second rotary element RE12, and the second rotating electrical machine MG2 and the intermediate input member IM are drivingly coupled to the third rotary element RE13. However, the present disclosure is not limited to this. The vehicle drive device 1 may be configured so that the first rotating electrical machine MG1 is drivingly coupled to the first rotary element RE11 of the differential gear unit PG0, the second rotating electrical machine MG2 and the intermediate input member IM are drivingly coupled to the second rotary element RE12, and the internal combustion engine EN is drivingly coupled to the third rotary element RE13. As shown in FIG. 13, as an example of such a configuration, the differential gear unit PG0 may be a double-pinion type planetary gear unit, the sun gear S0 may be the first rotary element RE11, the first rotating electrical machine MG1 may be drivingly coupled to the sun gear S0, the ring gear R0 may be the second rotary element RE12, the internal combustion engine EN may be drivingly coupled to the ring gear R0, the carrier CA0 may be the third rotary element RE13, and the second rotating electrical machine MG2 and the intermediate input member IM may be drivingly coupled to the carrier CA0.

Figure 12:
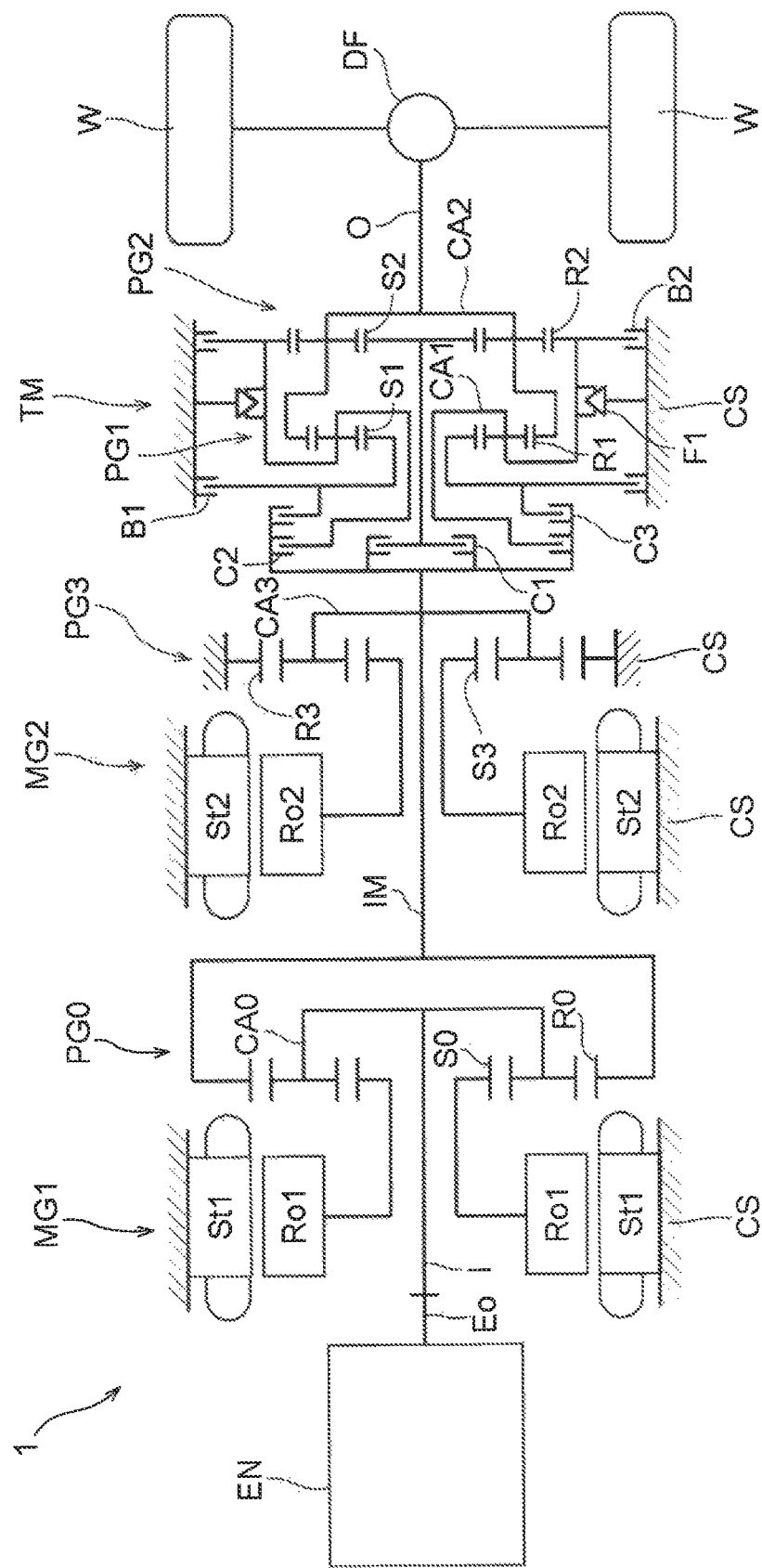
FIG. 12 is a skeleton diagram of a vehicle drive device according to another embodiment.

(4) The above embodiment is described with respect to an example in which the second rotating electrical machine MG2 is coupled to the intermediate input member IM and the third rotary element RE13 of the differential gear unit PG0 so as to rotate with the intermediate input member IM and the third rotary element RE13. However, the present disclosure is not limited to this. As shown in FIG. 12, the second rotating electrical machine MG2 may be drivingly coupled to the intermediate input member IM and the third rotary element RE13 of the differential gear unit PG0 so as to rotate in synchronization with the intermediate input member IM and the third rotary element RE13 with a speed difference corresponding to a predetermined gear ratio (speed ratio). In the example shown in FIG. 12, the second rotating electrical machine MG2 is drivingly coupled to the intermediate input member IM and the third rotary element RE13 of the differential gear unit PG0 via a single-pinion type third planetary gear unit PG3, the second rotating electrical machine MG2 is coupled to a sun gear S3 of the third planetary gear unit PG3 so as to rotate with the sun gear S3, the intermediate input member IM and the third rotary element RE13 of the differential gear unit PG0 are coupled to a carrier CA3 of the third planetary gear unit PG3 so as to rotate with the carrier CA3, and a ring gear R3 of the third planetary gear unit PG3 is held stationary with respect to the case CS. In this case, the rotational speed of the second rotating electrical machine MG2 is a rotational speed obtained by increasing the rotational speed of the intermediate input member IM and the third rotary element RE13 of the differential gear unit PG0 based on the gear ratio X3 of the third planetary gear unit PG3.

(5) The above embodiment is described with respect to an example in which at least one of the rotational speed $\omega e$ of the internal combustion engine EN during the differential gear shift control and the torque To transmitted from the shift device TM to the output member O during the differential gear shift control is set as a controlled parameter. However, the present disclosure is not limited to this. In addition to at least one of the rotational speed $\omega e$ of the internal combustion engine EN during the differential gear shift control and the torque To transmitted from the shift device TM to the output member O during the differential gear shift control, acceleration of the vehicle may further be included in controlled parameters. The acceleration of the vehicle can be detected by an acceleration sensor.

(6) The above embodiment is described with respect to an example in which the differential gear shift control unit 46 controls at least the output torques of the first rotating electrical machine MG1 and the second rotating electrical machine MG2 so that a controlled parameter that is controlled in the differential gear shift control undergoes a change similar to a change in controlled parameter controlled in the most recent shift device shift control. However, the present disclosure is not limited to this. The differential gear shift control unit 46 may store not only a change in controlled parameter controlled in the most recent shift device shift control but also cumulatively store changes in controlled parameters controlled in the shift device shift controls performed in the past so as to cause a change similar to a change in controlled parameter obtained by statistical processing such as averaging processing.

(7) The above embodiment is described with respect to an example in which the shift device shift control, the differential gear shift control, and the simulated shift control are performed in an upshift. However, the present disclosure is not limited to this. The shift device shift control, the differential gear shift control, and the simulated shift control may be performed in a downshift.

3. Summary of Embodiments

The embodiments described above have at least the following configuration.

A control device (30) that controls a vehicle drive device (1) including a first rotating electrical machine (MG1), a second rotating electrical machine (MG2), a differential gear unit (PG0) that has a first rotary element (RE11), a second rotary element (RE12), and a third rotary element (RE13) in order of arrangement in a speed diagram, the first rotating electrical machine (MG1) being drivingly coupled to the first rotary element (RE11), an internal combustion engine (EN) being drivingly coupled to one of the second rotary element (RE12) and the third rotary element (RE13), the second rotating electrical machine (MG2) and an intermediate input member (IM) being drivingly coupled to the other of the second rotary element (RE12) and the third rotary element (RE13), and a shift device (TM) that includes a plurality of engagement devices, that selectively establishes a plurality of shift speeds having different speed ratios according to engagement states of the plurality of engagement devices . . . , that shifts a rotational speed ($\omega im$) of the intermediate input member (IM) at the speed ratio of the established shift speed and transmits a resultant rotation to an output member (O) drivingly coupled to wheels (W), the control device (30) including: a shift device shift control unit (45) that performs shift device shift control in which the shift device shift control unit (45) changes a speed ratio (Keo), which is a ratio of a rotational speed ($\omega e$) of the internal combustion engine (EN) to a rotational speed ($\omega o$) of the output member (O), by changing at least the shift speed that is established by the shift device (TM); and a differential gear shift control unit (46) that performs differential gear shift control in which the differential gear shift control unit (46) changes the speed ratio (Keo), which is the ratio of the rotational speed ($\omega e$) of the internal combustion engine (EN) to the rotational speed ($\omega o$) of the output member (O), by changing rotational speeds of the first rotary element (RE11) and the second rotary element (RE12) of the differential gear unit (PG0) without changing the shift speed that is established by the shift device (TM), wherein the differential gear shift control unit (46) controls at least output torques of the first rotating electrical machine (MG1) and the second rotating electrical machine (MG2) so that a controlled parameter that is controlled during the differential gear shift control undergoes a change similar to a change in the controlled parameter that is controlled during the shift device shift control, the controlled parameter that is controlled during the differential gear shift control being at least one of the rotational speed ($\omega e$) of the internal combustion engine (EN) and torque To transmitted from the shift device (TM) to the output member (O).

With this configuration, the controlled parameter that is controlled during the differential gear shift control, namely at least one of the rotational speed ($\omega e$) of the internal combustion engine (EN) and the torque (To) transmitted from the shift device (TM) to the output member (O), can be made to undergo a change similar to a change in the controlled parameter that is controlled during the shift device shift control. Accordingly, even if a change in the speed ratio by the stepped shift device (TM) and a stepwise change in the speed ratio by the differential gear unit (PG0) that can steplessly change the speed ratio are combined, the driver can be restrained from feeling the difference in shift feel between these changes.

It is preferable that the differential gear shift control unit (46) control at least the output torques of the first rotating electrical machine (MG1) and the second rotating electrical machine (MG2) so that the controlled parameter that is controlled during the differential gear shift control undergoes a change similar to a change in the controlled parameter controlled during the most recent shift device shift control.

With this configuration, the shift feel of the differential gear shift control can be made close to the shift feel of the most recent shift device shift control. Accordingly, even if the differential gear shift control and the shift device shift control are performed alternately, the driver can be restrained from feeling the difference in shift feel between the differential gear shift control and the shift device shift control.

It is preferable that the differential gear shift control unit (46) record a change in the controlled parameter that is controlled during the shift device shift control, and control at least the output torques of the first rotating electrical machine (MG1) and the second rotating electrical machine (MG2) so that the controlled parameter that is controlled during the differential gear shift control undergoes a change similar to the change in the controlled parameter recorded during the shift device shift control.

With this configuration, a change similar to the change in the controlled parameter recorded during the shift device shift control can be caused during the differential gear shift control. Accordingly, the driver can be restrained from feeling the difference in shift feel even if the change in the controlled parameter which is caused during the shift device shift control varies due to the driving condition of a vehicle, aging of the shift device, production variation of the shift device, etc.

It is preferable that the differential gear shift control unit (46) control at least the output torques of the first rotating electrical machine (MG1) and the second rotating electrical machine (MG2) based on a change pattern that is preset so that the controlled parameter that is controlled during the differential gear shift control undergoes a change similar to a change in the controlled parameter that is controlled during the shift device shift control.

With this configuration, the change pattern can be preset as appropriate so that the driver does not feel the difference in shift feel.

It is preferable that the differential gear shift control unit (46) set an amount of change in the speed ratio (Keo) that is to be changed in the differential gear shift control, so that a change in the controlled parameter which is caused during the differential gear shift control varies according to the amount of change in the speed ratio (Keo).

With this configuration, an appropriate change in the controlled parameter can be made during the differential gear shift control according to the amount of change in the speed ratio (Keo). This can restrain the driver from having an uncomfortable shift feel.

It is preferable that a change in the rotational speed ($\omega e$) of the internal combustion engine (EN), which is the controlled parameter, be an amount of change in the rotational speed ($\omega e$) of the internal combustion engine (EN) and a period in which the rotational speed ($\omega e$) of the internal combustion engine (EN) changes, and a change in the torque transmitted from the shift device (TM) to the output member (O), which is the controlled parameter, be a change in the torque To transmitted from the shift device (TM) to the output member (O), which occurs while the rotational speed ($\omega e$) of the internal combustion engine (EN) is changing.

With this configuration, a change in the rotational speed ($\omega e$) of the internal combustion engine (EN) and a change in the torque transmitted from the shift device (TM) to the output member (O), which are the controlled parameters, can be made similar to actual changes that occur in the shift device shift control. The driver can be restrained from feeling the difference in shift feel.

It is preferable that acceleration of a vehicle further be included in the controlled parameter.

With this configuration, since the acceleration of the vehicle, which is an important parameter that affects a shift feel, is included in the controlled parameter, the driver can further be restrained from feeling the difference in shift feel.

INDUSTRIAL APPLICABILITY

The technique according to the present disclosure is preferably applicable to control devices that control a vehicle drive device including a first rotating electrical machine, a second rotating electrical machine, a differential gear unit, and a shift device.

The invention claimed is:

1. A control device for a vehicle drive device and that controls the vehicle drive device that includes a first rotating electrical machine, a second rotating electrical machine, a differential gear unit that has a first rotary element, a second rotary element, and a third rotary element in order of rotation speed, the first rotating electrical machine being drivingly coupled to the first rotary element, an internal combustion engine being drivingly coupled to one of the second rotary element and the third rotary element, the second rotating electrical machine and an intermediate input member being drivingly coupled to the other of the second rotary element and the third rotary element, and a shift device that includes a plurality of engagement devices, that selectively establishes a plurality of shift speeds having different speed ratios according to engagement states of the plurality of engagement devices, that shifts a rotational speed of the intermediate input member at the speed ratio of the established shift speed and transmits a resultant rotation to an output member drivingly coupled to wheels, the control device comprising:
an electronic control unit that is programmed to:
perform shift device shift control in order to change a speed ratio, which is a ratio of a rotational speed of the internal combustion engine to a rotational speed of the output member, by changing at least the shift speed that is established by the shift device; and
perform differential gear shift control in order to change the speed ratio by changing rotational speeds of the first rotary element and the second rotary element of the differential gear unit without changing the shift speed that is established by the shift device, wherein
the electronic control unit controls at least output torques of the first rotating electrical machine and the second rotating electrical machine so that a controlled parameter that is controlled during the differential gear shift control undergoes a change proportional to a change in the controlled parameter that is controlled during the shift device shift control, the controlled parameter that is controlled during the differential gear shift control being at least one of the rotational speed of the internal combustion engine and torque transmitted from the shift device to the output member.

2. The control device for the vehicle drive device according to claim 1, wherein
the electronic control unit controls at least the output torques of the first rotating electrical machine and the second rotating electrical machine so that the controlled parameter that is controlled during the differential gear shift control undergoes a change proportional to a change in the controlled parameter controlled during the most recent shift device shift control.

3. The control device for the vehicle drive device according to claim 2, wherein
the electronic control unit records a change in the controlled parameter that is controlled during the shift device shift control, and controls at least the output torques of the first rotating electrical machine and the second rotating electrical machine so that the controlled parameter that is controlled during the differential gear shift control undergoes a change proportional to the change in the controlled parameter recorded during the shift device shift control.

4. The control device for the vehicle drive device according to claim 3, wherein
the electronic control unit sets an amount of change in the speed ratio that is to be changed in the differential gear shift control, so that a change in the controlled parameter which is caused during the differential gear shift control varies according to the amount of change in the speed ratio.

5. The control device for the vehicle drive device according to claim 4, wherein
a change in the rotational speed of the internal combustion engine, which is the controlled parameter, is an amount of change in the rotational speed of the internal combustion engine and a period in which the rotational speed of the internal combustion engine changes, and
a change in the torque transmitted from the shift device to the output member, which is the controlled parameter, is a change in the torque transmitted from the shift device to the output member, which occurs while the rotational speed of the internal combustion engine is changing.

6. The control device for the vehicle drive device according to claim 5, wherein
acceleration of a vehicle is further included in the controlled parameter.

7. The control device for the vehicle drive device according to claim 1, wherein
the electronic control unit records a change in the controlled parameter that is controlled during the shift device shift control, and controls at least the output torques of the first rotating electrical machine and the second rotating electrical machine so that the controlled parameter that is controlled during the differential gear shift control undergoes a change proportional to the change in the controlled parameter recorded during the shift device shift control.

8. The control device for the vehicle drive device according to claim 1, wherein
the electronic control unit controls at least the output torques of the first rotating electrical machine and the second rotating electrical machine based on a change pattern that is preset so that the controlled parameter that is controlled during the differential gear shift control undergoes a change related to a change in the controlled parameter that is controlled during the shift device shift control.

9. The control device for the vehicle drive device according to claim 1, wherein
the electronic control unit sets an amount of change in the speed ratio that is to be changed in the differential gear shift control, so that a change in the controlled parameter which is caused during the differential gear shift control varies according to the amount of change in the speed ratio.

10. The control device for the vehicle drive device according to claim 1, wherein
a change in the rotational speed of the internal combustion engine, which is the controlled parameter, is an amount of change in the rotational speed of the internal combustion engine and a period in which the rotational speed of the internal combustion engine changes, and
a change in the torque transmitted from the shift device to the output member, which is the controlled parameter, is a change in the torque transmitted from the shift device to the output member, which occurs while the rotational speed of the internal combustion engine is changing.

11. The control device for the vehicle drive device according to claim 1, wherein
acceleration of a vehicle is further included in the controlled parameter.

12. The control device for the vehicle drive device according to claim 2, wherein
the electronic control unit controls at least the output torques of the first rotating electrical machine and the second rotating electrical machine based on a change pattern that is preset so that the controlled parameter that is controlled during the differential gear shift control undergoes a change proportional to a change in the controlled parameter that is controlled during the shift device shift control.

* * * * *